US012527717B2

(12) United States Patent
Ovalle et al.

(10) Patent No.: US 12,527,717 B2
(45) Date of Patent: Jan. 20, 2026

(54) AUTOMATED TEMPERATURE CONTROL SYSTEM FOR SPAS

(71) Applicant: Sundance Spas, Inc., Chino, CA (US)

(72) Inventors: Larry R. Ovalle, Glendora, CA (US); Erica A. Langpeter Moir, Santa Ana, CA (US); Brian Pierson, Beaverton, OR (US)

(73) Assignee: Sundance Spas, Inc., Chino, CA (US)

( * ) Notice: Subject to any disclaimer, the term of this patent is extended or adjusted under 35 U.S.C. 154(b) by 147 days.

(21) Appl. No.: 18/485,964

(22) Filed: Oct. 12, 2023

(65) Prior Publication Data
US 2024/0122798 A1 Apr. 18, 2024

Related U.S. Application Data

(60) Provisional application No. 63/455,898, filed on Mar. 30, 2023, provisional application No. 63/379,639, filed on Oct. 14, 2022.

(51) Int. Cl.
*A61H 33/00* (2006.01)
(52) U.S. Cl.
CPC ....... *A61H 33/005* (2013.01); *A61H 33/0095* (2013.01); *A61H 2033/0079* (2013.01); *A61H 2201/501* (2013.01); *A61H 2201/5082* (2013.01)
(58) Field of Classification Search
CPC .............. A61H 33/005; A61H 33/0095; A61H 2033/0079; A61H 2201/501; A61H 2201/5082; A61H 2201/0207; A61H 2201/5007; G05D 23/1917; G05D 23/1904
USPC ................................................ 4/541.1, 541.2
See application file for complete search history.

(56) References Cited

U.S. PATENT DOCUMENTS

| 8,370,001 B2 | 2/2013 | Love |
| 8,612,061 B2 | 12/2013 | Brochu et al. |
| 9,442,639 B2 * | 9/2016 | Laflamme ........... G06F 3/04817 |
| 10,060,775 B2 * | 8/2018 | Ruiz Cortez ........... G01F 1/075 |
| 10,159,624 B2 * | 12/2018 | Laflamme ............... H04W 4/80 |

(Continued)

FOREIGN PATENT DOCUMENTS

| GB | 2111394 A * | 7/1983 | ............ A61M 16/04 |
| WO | WO-2024243307 A1 * | 11/2024 | ............ A61M 16/04 |

OTHER PUBLICATIONS

International Search Report and Written Opinion for Internation Application No. PCT/US2023/076733 dated Jan. 5, 2024, in 15 pages.

*Primary Examiner* — Lori L Baker
(74) *Attorney, Agent, or Firm* — Knobbe, Martens, Olson & Bear, LLP

(57) ABSTRACT

A spa system including an operating mode that results in efficient and/or reduced electrical energy consumption while ensuring the use temperature is achieved no matter the time and/or date at which the user desires to enjoy the spa. The operating mode described herein obtains information indicating a time at which a user may like to enjoy the spa, precisely determines a time it takes to heat water in the spa from an ambient temperature to the use temperature, and causes the spa pump and/or heater to begin the process of heating the water to the use temperature at least the determined time prior to the time at which the user may begin enjoying the spa. A spa may not achieve peak efficiency without a spa operating mode that calculates the estimated time to heat a spa from an ambient temperature to the use temperature.

20 Claims, 16 Drawing Sheets

(56) References Cited

U.S. PATENT DOCUMENTS

| | | | |
|---|---|---|---|
| 10,925,804 B2* | 2/2021 | Ovalle | H04Q 9/00 |
| 11,083,342 B2* | 8/2021 | Rivera | A61H 1/00 |
| 11,959,494 B2* | 4/2024 | Pelletier | F04D 29/5806 |
| 2005/0127197 A1* | 6/2005 | Uy | F23N 1/082 |
| | | | 236/102 |
| 2012/0101647 A1* | 4/2012 | Laflamme | G05D 23/1923 |
| | | | 700/291 |
| 2015/0368921 A1* | 12/2015 | Dzindo | F24H 9/139 |
| | | | 62/238.7 |
| 2019/0314243 A1 | 10/2019 | Maccallum et al. | |
| 2020/0069516 A1* | 3/2020 | Zack | A61H 33/063 |
| 2021/0283010 A1 | 9/2021 | Ovalle et al. | |
| 2023/0046169 A1* | 2/2023 | Garcia Molina | A61B 5/4812 |
| 2024/0392595 A1* | 11/2024 | Beaty | F25B 49/02 |

* cited by examiner

AUTOMATED TEMPERATURE CONTROL SYSTEM FOR SPAS

CROSS-REFERENCE TO RELATED APPLICATIONS

This application claims the benefit of U.S. Provisional Application No. 63/379,639, entitled "SMART TEMPERATURE CONTROL SYSTEM FOR SPAS" and filed on Oct. 14, 2022, and of U.S. Provisional Application No. 63/455,898, entitled "AUTOMATED TEMPERATURE CONTROL SYSTEM FOR SPAS" and filed on Mar. 30, 2023, which are hereby incorporated by reference herein in their entireties.

TECHNICAL FIELD

The present disclosure generally relates to an automated temperature control system, and the use of such systems for spas and pools.

BACKGROUND

A spa unit or hot tub (referred to herein as a "spa") may pump water in and out of an interior area of the spa. The spa may further control the temperature of the water so that users sitting in the interior area of the spa remain comfortable. In fact, a user may be able to specify and/or change the desired water temperature. For example, the spa may utilize a control system, a pump, and a heater to maintain a user's desired water temperature setpoint (referred to herein as the "use temperature"). Spa controllers may operate in various modes depending on a user's desired frequency of enjoyment and use temperature. Additionally, operating a spa's pump and/or heater in an electrically efficient manner may depend how many days per week the user enjoys the spa or pool and at what times of day the user enjoys the spa. For example, a user who enjoys a spa every day may be operating a spa unit in the most efficient manner by constantly maintaining the spa at the use temperature, whereas a user who enjoys a spa once or twice per week may inefficiently consume electrical energy by constantly maintaining a use temperature during periods of non-use.

SUMMARY

The systems, methods, and devices described herein each have several aspects, no single one of which is solely responsible for its desirable attributes. Without limiting the scope of this disclosure, several non-limiting features will now be discussed briefly.

Described herein is an improved spa system including an operating mode that provides a user who desires to enjoy a spa at select dates and times per week the ability to efficiently consume electrical energy while ensuring the use temperature is achieved at the time and date the user desires to enjoy the spa. Without a spa operating mode that calculates the estimated time to heat a spa from an ambient temperature to the use temperature, users with varying spa use schedules may not obtain potential energy savings available to them. Further, users may consume an excessive amount of energy by incorrectly estimating the amount of time required to heat a spa's water temperature to the use temperature. Moreover, a user may miscalculate the warm up time required to achieve a use temperature by a given time, resulting in additional lead time before a user may enjoy the spa.

One aspect of the disclosure provides a system for determining a run schedule of a spa. The system comprises memory that stores computer-executable instructions. The system further comprises: a processor in communication with the memory, wherein the computer-executable instructions, when executed by the processor, cause the processor to: process an indication of a user spa schedule, ambient temperature data, and spa data, wherein the user spa schedule comprises a use temperature and a time for use of the spa; determine, based on the processed ambient temperature data and the spa data, a spa heating curve; estimate, based on the processed user spa schedule and the determined spa heating curve, a spa run schedule, wherein the spa run schedule comprises an initial heating time; and cause the spa to activate at least one of a pump of the spa or a heater of the spa at the initial heating time.

The system of the preceding paragraph can include any sub-combination of the following features: where the computer-executable instructions, when executed, further cause the processor to train an artificial intelligence model to identify a discrepancy between the spa heating curve and an actual heating curve of the spa using training data, wherein the training data comprises one or more training data items, wherein each training data item of the one or more training data items comprises an indication of an estimated heating curve of a first spa and an actual heating curve of the first spa and is labeled with an indication of a cause of a difference between the estimated heating curve of the first spa and the actual heating curve of the first spa; where the cause of the difference comprises one of a malfunctioning pump of the first spa, a malfunctioning heater of the first spa, or degraded insulation of the first spa; where each training data item of the one or more training data items further comprises at least one of a model type of the first spa, a location of the first spa, or a volume of the first spa; where the computer-executable instructions, when executed, further cause the processor to: process feedback data received from the spa, wherein the feedback data comprises the actual heating curve of the spa, apply the feedback data as an input to the trained artificial intelligence model, wherein application of the feedback data as the input to the trained artificial intelligence model causes the trained artificial intelligence model to output an indication of a component of the spa causing the discrepancy, and transmit a notification to a user device that comprises the indication of the component of the spa causing the discrepancy; where the computer-executable instructions, when executed, further cause the processor to generate an estimated energy savings of the spa using the spa run schedule; where the computer-executable instructions, when executed, further cause the processor to transmit, to a user device, at least one of the user spa schedule or the estimated energy savings of the spa; where the spa data comprises at least one of an indication of a volume of the spa, an insulation coefficient of the spa, a power rating of the pump of the spa, a power rating of the heater of the spa, a spa model, a spa serial number, or an initial water temperature of the spa; where the indication of the volume of the spa is received from a level indicator; where the ambient temperature data is one of an actual air temperature measured at the spa, an air temperature determined based on a location of the spa, or an average regional temperature corresponding to a location of the spa; and where the computer-executable instructions, when executed, further cause the processor to: obtain, from a sensor coupled to one of a spa cover of the spa or a spa shell of the spa, an indication that the sensor detects a presence of a component coupled to one of the spa shell of the spa or the spa cover of the spa, and cause the spa to deactivate at least one of the pump of the spa or the heater of the spa.

Another aspect of the disclosure provides a computer-implemented method for determining a run schedule of a spa. The computer-implemented method comprises: receiving an indication of a user spa schedule, ambient temperature data, and spa data, wherein the user spa schedule comprises a use temperature and a time for use of the spa; determining, based on the ambient temperature data and the spa data, a spa heating curve; estimating, based on the user spa schedule and the determined spa heating curve, a spa run schedule, wherein the spa run schedule comprises an initial heating time; and causing the spa to activate at least one of a pump of the spa or a heater of the spa at the initial heating time.

The computer-implemented method of the preceding paragraph can include any sub-combination of the following features: where the computer-implemented method further comprises training an artificial intelligence model to identify a discrepancy between the spa heating curve and an actual heating curve of the spa using training data, wherein the training data comprises one or more training data items, wherein each training data item of the one or more training data items comprises an indication of an estimated heating curve of a first spa and an actual heating curve of the first spa and is labeled with an indication of a cause of a difference between the estimated heating curve of the first spa and the actual heating curve of the first spa; where the cause of the difference comprises one of a malfunctioning pump of the first spa, a malfunctioning heater of the first spa, or degraded insulation of the first spa; where each training data item of the one or more training data items further comprises at least one of a model type of the first spa, a location of the first spa, or a volume of the first spa; where the computer-implemented method further comprises: receiving feedback data from the spa, wherein the feedback data comprises the actual heating curve of the spa, applying the feedback data as an input to the trained artificial intelligence model, wherein application of the feedback data as the input to the trained artificial intelligence model causes the trained artificial intelligence model to output an indication of a component of the spa causing the discrepancy, and transmitting a notification to a user device that comprises the indication of the component of the spa causing the discrepancy; and where estimating the spa run schedule further comprises: generating an estimated energy savings of the spa using the spa run schedule, and transmitting, to a user device, at least one of the user spa schedule or the estimated energy savings of the spa.

Another aspect of the disclosure provides a non-transitory, computer-readable medium comprising computer-executable instructions for determining a run schedule of a spa, wherein the computer-executable instructions, when executed by a computer system, cause the computer system to: process an indication of a user spa schedule, ambient temperature data, and spa data, wherein the user spa schedule comprises a use temperature and a time for use of the spa; determine, based on the processed ambient temperature data and the spa data, a spa heating curve; estimate, based on the processed user spa schedule and the determined spa heating curve, a spa run schedule, wherein the spa run schedule comprises an initial heating time; and cause the spa to activate at least one of a pump of the spa or a heater of the spa at the initial heating time.

The non-transitory, computer-readable medium of the preceding paragraph can include any sub-combination of the following features: where the computer-executable instructions, when executed, further cause the computer system to train an artificial intelligence model to identify a discrepancy between the spa heating curve and an actual heating curve of the spa using training data, wherein the training data comprises one or more training data items, wherein each training data item of the one or more training data items comprises an indication of an estimated heating curve of a first spa and an actual heating curve of the first spa and is labeled with an indication of a cause of a difference between the estimated heating curve of the first spa and the actual heating curve of the first spa; where the computer-executable instructions, when executed, further cause the computer system to: process feedback data received from the spa, wherein the feedback data comprises the actual heating curve of the spa, apply the feedback data as an input to the trained artificial intelligence model, wherein application of the feedback data as the input to the trained artificial intelligence model causes the trained artificial intelligence model to output an indication of a component of the spa causing the discrepancy, and transmit a notification to a user device that comprises the indication of the component of the spa causing the discrepancy; and where the computer-executable instructions, when executed, further cause the computer system to: generate an estimated energy savings of the spa using the spa run schedule, and transmit, to a user device, at least one of the user spa schedule or the estimated energy savings of the spa.

BRIEF DESCRIPTION OF THE DRAWINGS

Throughout the drawings, reference numbers may be re-used to indicate correspondence between referenced elements. The drawings are provided to illustrate example embodiments descried herein and are not intended to limit the scope of the disclosure.

FIGS. 5A-5H illustrate examples of an improved graphical user interface for selecting a spa run schedule, according to one embodiment.

DETAILED DESCRIPTION

Figure 1:
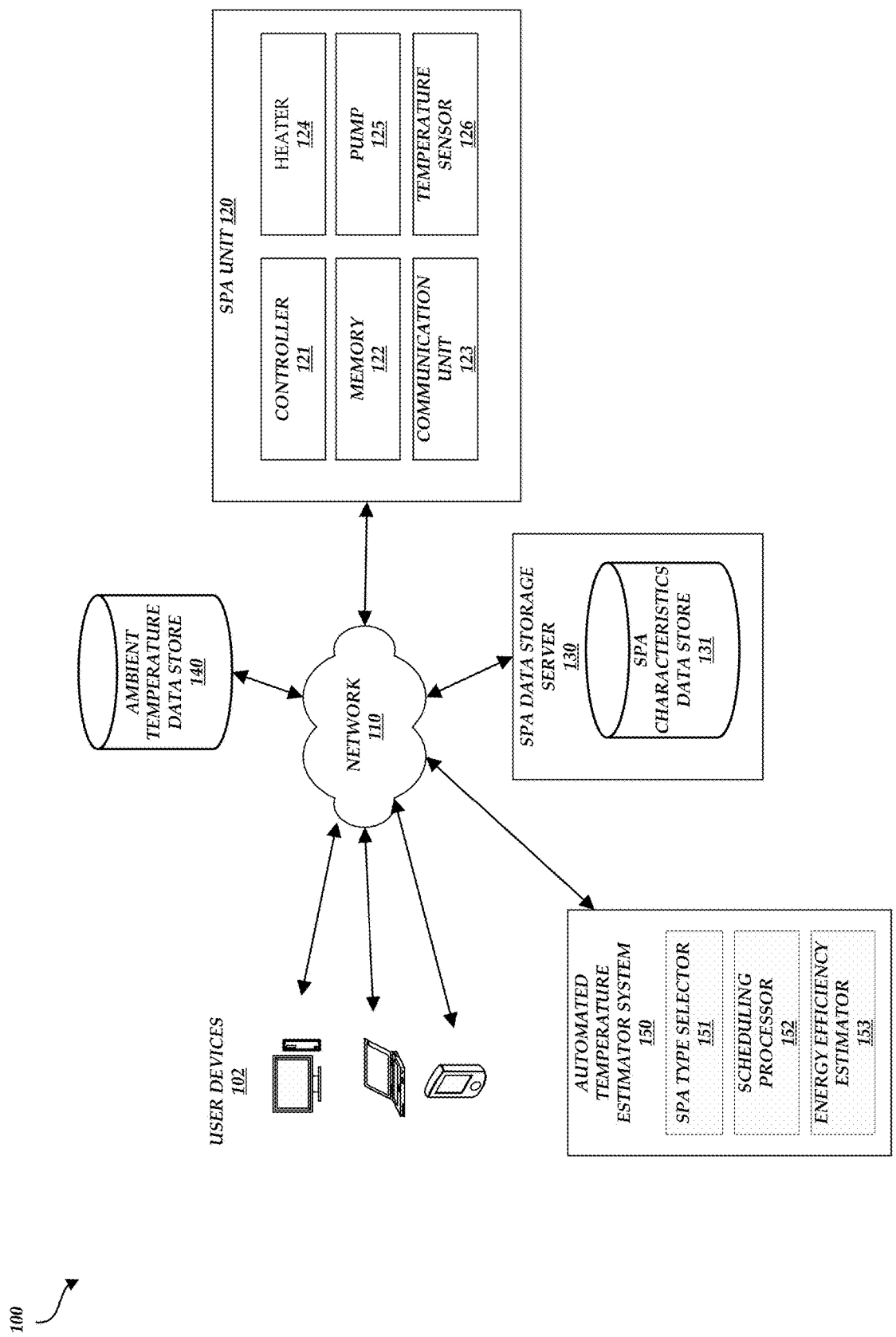
FIG. 1 shows a block diagram of an illustrative operating environment in which an automated temperature estimator system uses data to determine an energy efficiency and operating mode of a spa unit.

As described above, a spa may utilize a control system, a pump, and a heater to maintain a desired use temperature. Spa controllers may operate in various modes depending on a frequency by which a user uses the spa and the desired use temperature. Additionally, operating a spa's pump and/or heater in an electrically efficient manner may depend on the frequency with which the user enjoys the spa (e.g., the number of hours per day, days per week, etc. that the spa is used) and at what times of day the user enjoys the spa. For example, a user who enjoys a spa every day may be operating a spa unit in the most efficient manner by constantly maintaining the spa at the use temperature, whereas a user who enjoys a spa once or twice per week may inefficiently consume electrical energy by constantly maintaining a use temperature during periods of non-use. Generally, users of a spa desire that the spa maintain the use temperature in the most energy efficient manner possible. Accordingly, the present disclosure is directed to an improved spa that efficiently maintains a use temperature during periods of use and/or non-use.

For example, a spa can maintain a use temperature by modulating a pump and/or heater element. A spa controller may have several different operating modes, having varied electrical efficiency characteristics, that a user may select based on the use temperature and intended usage of the spa.

A first operating mode may control the spa pump and/or heater to maintain the spa at a constant water temperature (e.g., 102 degrees Fahrenheit) periodically (e.g., every hour, every day, etc.). The first operating mode may be referred to herein as a "standby mode" or "standby operating mode." The advantage of a standby operating mode is that a spa may be held at a constant temperature, such that the user may enjoy the spa at any time without waiting for the spa to reach a use temperature. However, because the spa may be in operation frequently in the standby operating mode to maintain a constant water temperature, the standby operating mode may be energy inefficient. Consequently, a standby operating mode may not be ideal for users who do not enjoy the spa frequently (e.g., daily).

A second operating mode may maintain the spa at a low water temperature, in which the spa's pump and/or heater are periodically energized to cycle water within the spa to maintain a clean spa for prolonged periods of non-use. The second operating mode may be referred to herein as a "vacation mode" or "vacation operating mode." The vacation mode may control the spa at a temperature setpoint below the use temperature (e.g., 10 degrees, 20 degrees, 30 degrees, 40 degrees, etc. below the use temperature). The vacation mode may be more energy efficient than the standby operating mode given that the temperature water may be maintained at a level below the use temperature.

Additionally, the user may operate the spa in a manual operating mode in which the user manually causes the spa pump and heater to be energized (e.g., via selection of a button or other user input). Operating the spa in the manual operating mode may result in inconsistent spa temperatures, thereby reducing the user's enjoyment of the spa. In fact, operating the spa in the manual operating mode may result in an inefficient use of electrical energy given the inconsistent nature by which the user may operate the spa.

Thus, the standby operating mode and the manual operating mode typically result in inefficient energy usage. The vacation operating mode may be more energy efficient, but having the water temperature maintained at a level below the use temperature may negatively affect a user's enjoyment of the spa.

A user could attempt to take advantage of the energy efficiency (interchangeably called an energy savings) of the vacation operating mode by modulating from the vacation operating mode to the standby operating mode or the manual operating mode some time before the user would like to enjoy the spa. However, modulating to the standby operating mode or the manual operating mode may involve the user attempting to anticipate the amount of time it may take for the spa to heat to the use temperature and changing the spa operating mode at least that amount of time before the user intends to enjoy the spa. Anticipating the time it may take to heat from an initial water temperature to the use temperature of a spa (herein the spa's "heating curve") may be difficult for a user to determine given that physical characteristics of the spa (e.g., spa volume, insulation rating of the spa, the flow characteristics of the pump, heater power rating, etc.), ambient air temperature, other weather phenomena, time of day, day of year, the water temperature of water being cycled into the spa, the amount of current being drawn by different components of the spa, and/or the like can affect the amount of time it takes for the spa to heat the water to the use temperature.

Accordingly, described herein is an improved spa system including an operating mode that results in efficient and/or reduced electrical energy consumption while ensuring the use temperature is achieved no matter the time and/or date at which the user desires to enjoy the spa. For example, the operating mode described herein may obtain information indicating a time at which a user may like to enjoy the spa, precisely determine a time it may take to heat water in the spa from an ambient temperature (e.g., an idle temperature) to the use temperature, and cause the spa pump and/or heater to begin the process of heating the water to the use temperature at least the determined time prior to the time at which the user may begin enjoying the spa. Without a spa operating mode that calculates the estimated time to heat a spa from an ambient temperature to the use temperature, a spa may consume more energy than is necessary to heat the water to the use temperature at the appropriate time. In fact, users are likely to estimate incorrectly the amount of time it may take to heat the water of the spa to the use temperature given the factors described above that may affect this estimate. As a result, a spa may consume even more energy than is necessary to heat the water to the user temperature if a user relies on the manual operating mode and overestimates the initial heating time, or the use temperature may not be achieved in time if a user relies on the manual operating mode and underestimates the initial heating time.

The operating mode described herein may be referred to as an automated temperature operating mode. In an automated temperature operating mode, a spa controller may determine an efficient spa run schedule that achieves a use temperature at the user's predetermined date and time while using the least amount of electrical energy. In particular, the spa controller may deenergize (e.g., power down, turn off, put into sleep mode, deactivate, de-actuate, etc.) the spa pump and/or heater during periods of non-use. When the user selects or otherwise provides an intended date and/or time for enjoyment of the spa, the spa controller may estimate a heating curve based on the spa model's characteristics and calculate a lead time for the spa to achieve the use temperature based on the heating curve. The spa controller may then energize (e.g., power up, turn on, activate, actuate, etc.) the spa pump and heater in accordance with the calculated heating curve to ensure the spa reaches the use temperature at the user's selected date and/or time.

Providing a seamless user experience while selecting an operating mode for a spa is desirable. The operating modes described herein may be presented to the user via one or more graphical user interfaces (GUI). The GUI may be conveniently presented to a user from an external device. A user selected operating mode may be transmitted from the external device to the spa controller via a network. Additionally, the GUI may be provided by a screen in communication with the spa controller of the spa unit. Previous GUI designs, however, requested that the user complete unnecessary and/or too many steps to select a run schedule, provided inaccurate or missing data during energy efficiency calculations, and/or were incompatible between differing screen sizes. For example, a user may become frustrated because a previous GUI requested two separate screens and 12 individual selections before a user could change the spa run schedule. Additionally, the user may become frustrated because the user was first requested to select a use temperature before the run schedule when the user's primary focus is on the run schedule. Further, previous GUI's presented data regarding an estimated savings without first requesting any user data, such as a use temperature or a run schedule. Even if the user was able to determine a temperature and run schedule, the user may be prompted to use a specific screen as previous GUIs were not formatted to be compatible between various screen dimensions. For example, data viewed on a webpage may be lost when the same data is transferred to a small screen of a mobile device. Previous GUI's may not provide the scheduling resolution desired by the user. For example, a GUI may allow the user to schedule times for use in one-hour increments, when the user may desire to use the spa at a time within a one-hour increment.

To improve the GUI and overall user experience for a user selecting an operating mode of a spa, the GUI disclosed herein may be functionally simplified, compatible across multiple screen sizes, and/or request data from the user in a logical manner. For example, an improved GUI may present information pertinent to a user on one screen, allowing the user to select user data for the automated temperature operating mode without having to cumbersomely manage two screens. The GUI may present data for selection during an automated temperature operating mode based on the user's primary focus, for example by requesting a run schedule before a use temperature. The GUI may request a run schedule before presenting information regarding energy efficiency of the spa, thereby avoiding confusion of displaying an energy savings before displaying a run schedule. A GUI may format information presented to the user, such that regardless of the screen size, the user is able to see and select all the data required to enter the automated temperature operating mode. Additionally, an improved GUI may allow a user to select a run schedule in increments of one minute, ten minutes, fifteen minutes, and/or the like instead of limiting the user to using one hour increments.

While the automated temperature operating mode may achieve efficient energy usage for any type of user no matter how often the user uses the spa, the automated temperature operating mode may be especially useful for those users who use the spa a certain number of times a week (e.g., once or twice a week at a specific time or specific times of the day, three or four times a week at a specific time of the day, etc.).

FIG. 1 is a block diagram of an illustrative operating environment 100 in which an automated temperature estimator system 150 uses a spa data storage server 130 and an ambient temperature data store 140 to determine a spa run schedule for a spa unit 120. The operating environment 100 further includes one or more spa data storage servers 130 that may communicate with the automated temperature estimator system 150 and the ambient temperature data store 140 via a network 110 to provide spa criteria that includes a spa model number, spa pump electrical characteristics, spa heater electrical characteristics, the spa heating and cooling coefficient (referred to herein as the R-value), the volume of the spa, and ambient temperature data for a spa's location. Additionally, the operating environment 100 can include a spa unit 120 with which the automated temperature estimator system 150 may communicate via network 110 to transmit an estimated run schedule based on the data received from the ambient temperature data store 140 and the spa data storage server 130. Furthermore, the operating environment 100 includes various user devices 102 that may communicate with the automated temperature estimator system 150 to provide a spa user's data and/or to request that the spa enter an automated temperature operating mode.

The spa unit 120 can be any type of spa or pool. The spa unit 120 may comprise of a controller 121, memory 122, a communication unit 123, a heater 124, a pump 125, and a temperature sensor 126. For example, the spa unit 120 can be a stand-alone spa having a pump 125 with an inlet and discharge connected to the spa unit 120. The pump 125 can be energized by the controller 121 such that the water in the spa unit 120 is circulated by the pump 125. Additionally, the spa unit 120 can include a heater 124. The heater 124 can be electrically connected to the controller 121 such that the controller 121 may energize the heater 124. The heater 124 may be mechanically connected in the spa unit 120 such that the circulated water of the spa unit 120 comes into contact with the heater 124. The spa unit 120 may include a temperature sensor 126. The temperature sensor 126 can be any form of instrumentation designed to determine, for example, the temperature of the water within a spa unit 120. In an example implementation, the temperature sensor 126 may be one or more of the following types of temperature sensors: a thermocouple, a resistance temperature detector (RTD), and/or any other type of thermal sensor. The temperature sensor 126 may transmit temperature data to the controller 121. Alternatively, the temperature sensor 126 may be able to detect the ambient air temperature at the location of the spa unit 120, and transmit ambient air temperature data to the controller 121.

Further, the spa unit 120 can store information obtained by the controller 121 locally in memory 122 (e.g., spa run schedule, spa operating modes, spa criteria, etc.). Additionally, the spa unit 120 includes a communication unit 123. The communication unit 123 can transmit and/or receive data via the network 110, thereby communicating with one or more user devices 102, the spa data storage server 130, the ambient temperature data store 140, and/or the automated temperature estimator system 150. For example, the communication unit 123 may receive an automated temperature run schedule from the automated temperature estimator system 150, and/or receive a command to enter one or more operating modes from the user devices 102.

Additionally, the spa unit 120 incudes a controller 121. The controller 121 can be any type of programmable logic controller (PLC) and/or microprocessor configured to process received commands from the communication unit 123, send and retrieve data from the memory 122, and/or receive and calculate operating parameters of the spa's heater 124 and/or pump 125 based on one or more sensors, such as the temperature sensor 126. Additionally, the controller 121 may energize and/or deenergize the pump 125 and/or heater 124 based on the operating mode of the controller 121.

In an illustrative example, the controller 121 can receive from the communication unit 123 a command from a user device 102 via network 110 to enter into a standby operating mode and maintain a spa unit 120 set temperature. The controller 121 may then retrieve from memory 122, parameters related to the standby operating mode, such as pump 125 and heater 124 maximum/minimum run timers, the temperature sensor frequency, and/or any control algorithms necessary to control the spa water temperature to maintain the use temperature.

Optionally, the spa unit 120 can include one or more additional sensors in communication with the controller 121. The one or more sensors can be a leak detection device, a water level indicator, a limit switch, and/or the like. The controller 121 may receive input form the one or more additional sensors to, for example, deenergize the pump 125 based on an input from the leak detector and/or level indicator. Additionally, a limit switch can be positioned such that it provides an indication to the controller 121 in the event that, for example, the cover of a spa unit 120 is removed.

The automated temperature estimator system 150 can be a computing system configured to estimate the energy efficiency and spa run schedule of a spa unit 120. For example, the automated temperature estimator system 150 can obtain a spa model, a user's intended spa usage schedule, spa water temperature, and ambient temperature data to determine an estimated date and/or time that the spa controller 121 should energize the heater 124 and pump 125 such that the spa temperature meets a use temperature at the user's desired date and/or time.

The automated temperature estimator system 150 may be a single computing device, or it may include multiple distinct computing devices, such as computer servers, logically or physically grouped together to collectively operate as a server system. The components of the automated temperature estimator system 150 can be implemented in application-specific hardware (e.g., a server computing device with one or more ASICs) such that no software is necessary, or as a combination of hardware and software. In addition, the modules and components of the automated temperature estimator system 150 can be combined on one server computing device or separated individually or into groups on several server computing devices. In some embodiments, the automated temperature estimator system 150 may include additional or fewer components than illustrated in FIG. 1.

The automated temperature estimator system 150 can include various modules, components, data stores, and/or the like to provide the energy efficiency and spa run schedule functionality described herein. For example, the automated temperature estimator system 150 can include a spa type selector 151, a scheduling processor 152, and/or an energy efficiency estimator 153.

The spa type selector 151 can determine, based on the user data and the spa data, the spa type for which the user data and spa data originates. For example, the user data provided to the automated temperature estimator system 150 by a user device 102 may be from an application running on a user device 102 that includes a spa model, and/or spa serial number. Additionally, the user data might include a historical record of the maintenance report for the specific spa unit 120. The spa type selector 151 can use the spa model information to determine the heating and cooling characteristics of a specific spa unit 120. Further, the spa selector 151 may have access to a data store, such as the spa data storage server 130, where a database of spa models and/or spa heating and cooling characteristics exist. The spa type selector 151 can extract a specific spa unit's 120 heating and/or cooling characteristic for use by the scheduling processor 152. The extracted spa characteristics can include the spa model's R-Value, the spa's volume, the spa's pump 125 characteristics (e.g., gallons per minute, pump electrical current and/or voltage ratings), the spa's heater 124 characteristics (e.g., heater current and/or voltage ratings, heater power ratings in kW, etc.), the spa's current water temperature (e.g., from temperature sensor 126), and/or the insulation coefficient of the spa unit 120. The spa type selector 151 can forward the appropriate spa characteristics and/or algorithms to the scheduling processor 152.

Once the specific spa unit 120 characteristics are obtained, the scheduling processor 152 can begin to determine an estimated run schedule for the spa utilizing a scheduling algorithm. For example, the scheduling processor 152 may determine, based on the spa characteristics, the spa's heating curve and/or a specific date and/or time to energize the spa heater 124 and/or pump 125 in advance of the user's intended date and/or time for enjoying the spa unit 120. As a result, when the date and/or time at which the user intends to enjoy the spa unit 120 arrives, the spa unit 120 may concurrently reach the use temperature. The scheduling processor 152 may calculate the estimated heating curve based on the spa characteristics described herein. Additionally, the scheduling processor 152 may access an ambient temperature data store 140 via the network 110, where the scheduling processor 152 may use the ambient temperature of the user's spa unit 120 location in executing the scheduling algorithm. Additionally, the schedule processor 152 may apply an additional time interval to the estimated lead time (herein referred to as an "early arrival" time), such that the spa achieves the use temperature at a time before the user's intended use time (e.g., 10, 15, 25, etc. minutes before the intended use time).

In an example implementation, the scheduling processor 152 determines a spa run schedule for a spa unit 120 based on the received user data from a user device 102, the received spa characteristics from a spa data storage server 130, and/or an ambient temperature from the ambient temperature data store 140. The spa run schedule may be a daily schedule, a weekly schedule, a monthly schedule, and/or the like. The determined spa run schedule for the spa unit 120 may then be transmitted, via network 110, to the communication unit 123 of the spa unit 120. The controller 121 then retrieves the spa run schedule from the communication unit 123 and stores the spa run schedule in memory 122. The controller 121 can then, in accordance with the communicated spa run schedule, energize the pump 125 and/or heater 124 such that the spa run schedule is executed.

Alternatively, the scheduling processor 152 can determine and transmit one or more instructions for a spa unit 120 based on a determined run schedule. The scheduling processing 152 can determine the run schedule based on the user data received from a user device 102, the spa characteristics received from a spa data storage server 130, and/or an idle temperature of the spa unit 120 water. For example, the scheduling processor 152 can determine an estimated time to heat the spa unit 120 water using the user data (e.g., the target use temperature), the spa characteristics (e.g., the R-value, which may represent a cooling factor of the spa unit 120, the spa unit 120 model type, etc.), and the idle temperature (e.g., a current water temperature of the spa unit 120). The scheduling processor 152 can then determine the run schedule (e.g., determine how much time before an intended use that heating should begin so that the use temperature is reached by the time of the intended use) using the estimated time to heat the spa unit 120. The one or more instructions may include, for example, executable code to energize or deenergize the pump 125 and/or heater 124, a dwell or idle time where the spa pump 125 and/or heater 124 remain deenergized for a period of time, a setpoint for the spa water temperature, and/or a request to transmit one or more spa characteristics to the scheduling processor 152. The one or more instructions can represent a spa run schedule, such as a daily schedule, a weekly schedule, a monthly schedule, and/or the like. The scheduling processor 152 may transmit one or more instructions based on the run schedule, via network 110, to the communication unit 123 of the spa unit 120. The controller 121 then retrieves the one or more instructions from the communication unit 123, executes the received instructions, and stores the received instructions in memory 122. The controller 121 can then, in accordance with the received instruction, energize and/or deenergize the pump 125 and/or heater 124 such that the spa run schedule is executed.

Before, during, and/or after the spa run schedule is determined, the energy efficiency estimator 153 may determine whether operating the spa controller 121 in an automated temperature operating mode at the user's intended date and/or time will provide the user with an energy savings. The energy efficiency estimator 153 may determine the energy savings of a spa unit 120 operating in an automated temperature operating mode by day, week, month, and/or any other desired time period. Further, the energy efficiency estimator 153 can transmit the energy efficiency results, via the network 110, to a user device 102. Alternatively or in addition, the energy efficiency estimator 153 can determine whether the user will save energy by operating in an automated temperature operating mode versus operating in a standby operating mode. For example, the energy efficiency estimator 153 may transmit, via the network 110, a command to the spa unit 120 to operate in a standby operating mode if the energy efficiency estimator 153 determines that, based on the user's intended dates and/or times to enjoy the spa unit 120, an energy savings will not be achieved by operating in an automated temperature operating mode.

Furthermore, the automated temperature estimator system 150 can send to the spa unit 120 an instruction to lower the spa unit 120 water temperature to an idle temperature, which causes the spa unit 120 to deenergize the pump 125 and/or heater 124, causes the spa unit 120 to prompt a user to leave the spa unit 120 uncovered, and/or otherwise causes the spa unit 120 to take action to lower the spa unit 120 water temperature. The automated temperature estimator system 150 can send the instruction to the spa unit 120 a threshold amount of time after the last use of the spa unit 120 and/or after the last time the spa unit 120 was first used (e.g., 1 hour after a user last used the spa unit 120, 2 hours after a user last used the spa unit 120, 3 hours after a user last used the spa unit 120, 1 hour after the scheduled intended use time, 2 hours after the scheduled intended use time, 3 hours after the scheduled intended use time, etc.). The automated temperature estimator system 150 can determine the idle temperature based on user data, such as a user tolerance of a wait time for an unscheduled use of the spa unit 120 (e.g., how much time a user is willing to wait for the spa unit 120 water to heat to the use temperature in a situation in which no or little pre-heating of the water occurred). For example, the automated temperature estimator system 150 can set the idle temperature to be a temperature at which it would take at most the user-tolerated wait time for the spa unit 120 to heat the water from the set idle temperature to the use temperature. The automated temperature estimator system 150 can transmit the instruction to lower the water temperature to the idle temperature once or periodically after the spa unit 120 was last used.

The spa data storage server 130 can be a computing system configured to store and provide access to a database of spa unit 120 models and/or corresponding spa unit 120 heating characteristics. For example, spa data storage server 130 can obtain spa unit 120 model and/or heating characteristics from one or more user devices 102 via the network 110. Alternatively or in addition, the spa data storage server 130 can calculate the heating curve for each spa unit 120 model based on the received spa characteristics. The spa data storage server 130 can store spa characteristics, such as the model and/or spa heating characteristics, in the spa characteristics data store 131. As described herein, the spa data storage server 130 can provide spa unit 120 model and/or spa unit 120 heating characteristics to the automated temperature estimator system 150 via network 110.

The ambient temperature data store 140 may be temperature data associated with one or more temperature sensors and/or temperature data stores. The ambient temperature data store 140 may include ambient temperature data for a location of a specific spa unit 120 (e.g., the zip code, city, state, etc. where the spa unit 120 exists, the latitude and/or longitude coordinates of the spa unit 120, etc.). The ambient temperature data may be a daily ambient temperature for a specific location, a zip code, and/or a region. Additionally and/or alternatively, the ambient temperature data store 140 may contain an average weekly, monthly, and/or quarterly temperature for the spa's zip code and/or a region.

While the ambient temperature data store 140 is depicted as being external to the automated temperature estimator system 150, this is not meant to be limiting. For example, not shown, the ambient temperature data store 140 can be internal to the automated temperature estimator system 150. Additionally and/or alternatively, the ambient temperature data store 140 may be a database residing on a user device 102 that is transmitted to the automated temperature estimator system 150 via network 110. Furthermore, not shown, the functionality of the automated temperature estimator system 150 and the spa data storage server 130 can be combined into the same component or entity.

In some embodiments, the automated temperature estimator system 150 can use artificial intelligence (e.g., machine learning, neural networks, etc.) to identify nuances and/or discrepancies between an estimated heating curve and an actual heating curve of a specific spa unit 120. Further, the automated temperature estimator system 150 may utilize artificial intelligence to determine maintenance intervals of the spa components. For example, the automated temperature estimator system 150 may train an artificial intelligence model to identify nuances and/or discrepancies using training data that includes, for each training data item, an indication of an estimated heating curve and an actual heating curve that are labeled with an indication of component(s) that caused a difference between the two heating curves (e.g., a degraded or malfunctioning pump 125, heater 124, insulation, etc.). Optionally, each training data item may include additional data, such as the spa unit 120 model type, the location of the spa unit 120, spa unit 120 volume, and/or the like. The automated temperature estimator system 150 can then receive feedback data from the spa unit 120 based on an observed heating curve of the specific spa unit 120 (e.g., where the feedback data may include the observed heating curve of the spa unit 120, the estimated heating curve, the spa unit 120 model type, the spa unit 120 location, spa unit 120 volume, etc.), and apply the feedback data as an input to the trained artificial intelligence model. In response, the trained artificial intelligence model may output an indication of a component or components that may be causing the discrepancy. The automated temperature estimator system 150 may further transmit a notification to a user device 102 via network 110 to notify a user of the possibly degraded spa component(s).

Advantageously, a user desiring to enjoy a spa unit 120 can use an external electronic device to transmit commands to a spa controller 121 such that the spa controller 121 can change the operating mode of the spa unit 120 based on received commands from the external device.

Additionally, and/or alternatively, the spa unit 120 can include one or more sensors in addition to and/or in place of the temperature sensor 126 that may be electrically connected to the spa controller 121. In an example implementation, the spa unit 120 can include one or more of a limit switch, a leak detector, and/or a level indicator.

In an example implementation, a limit switch can be used to determine whether a spa unit 120 cover has been removed. Advantageously, a limit switch can send a signal to the controller 121 indicating that a spa unit 120 cover is removed, and the controller 121 may adjust the operating mode of the spa unit 120 accordingly.

In an example implementation, a leak detector can be used to determine whether a spa unit 120 is leaking water. Advantageously, a leak detector can send a signal to the controller 121 indicating that a leak within the spa unit 120 plumbing is detected, and the controller 121 may adjust the operating mode of the spa unit 120 accordingly. For example, changing the operating mode from a vacation operating mode to "OFF" may preserve the integrity of the pump 125 and/or heater 124.

In an example implementation, a level indicator can be used to determine whether a spa unit 120 is leaking water and/or used to determine the heating curve of a spa unit 120. Advantageously, a level indicator can be used similarly and/or the same as the leak detector described above. Alternatively and or in addition, a level indicator can send a signal to a controller 121, indicating the level of water of a spa unit 120. The controller 121 may calculate a new heating curve for the spa unit 120 based on the level of the spa unit 120. Additionally, the newly calculated heating curve can be used to determine whether additional heating time is required for a spa unit 120 to reach a use temperature.

Example Block Diagram for Determining a Spa Run Schedule

Figure 2:
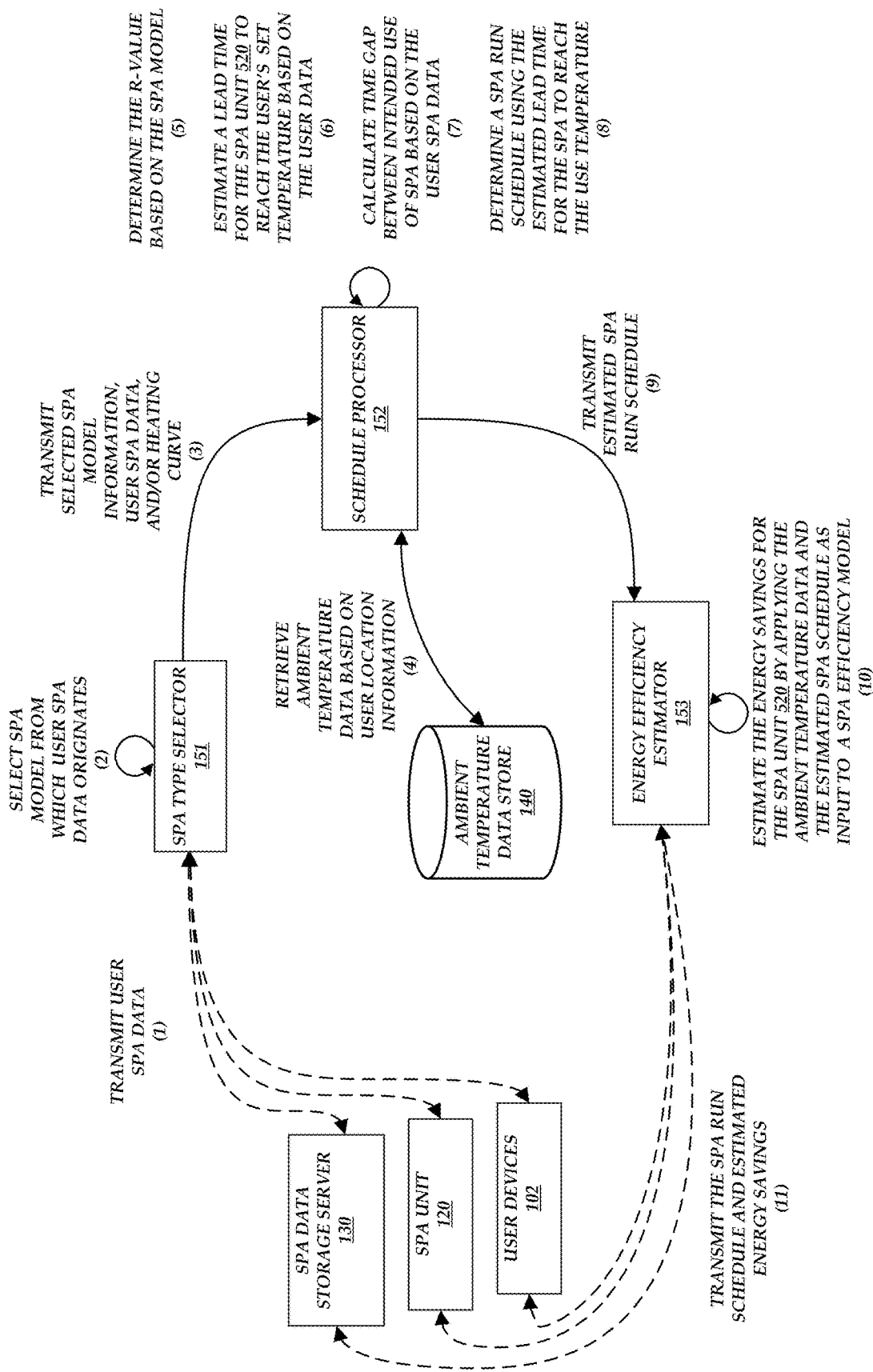
FIG. 2 illustrates is a flow diagram illustrating the operations performed by the components of the operating environment of FIG. 1 to determine an energy efficiency and operating mode of a spa.

FIG. 2 is a flow diagram illustrating the operations performed by the components of the operating environment 100 of FIG. 1 to determine a spa run schedule based on user inputs and external data from a server, such as the spa data storage server 130.

As illustrated in FIG. 2, either a user device 102, a spa unit 120, or a spa data storage server 130 transmits user spa data (e.g., a user's use temperature and the user's intended dates/or and times for enjoyment of the spa, the spa model number, the spa heating curve, and/or the volume of the spa) to a spa type selector 151 at (1). For example, a spa type selector 151 can receive user spa data from the user device 102, from the spa unit 120, and/or from the spa data storage server 130. As an example, a user can transmit to the spa type selector 151 via an interface on the user device 102, the user spa data. Alternatively or in addition, the user can transmit user spa data from the spa unit 120 to the spa type selector 151. In an example implementation, a user can elect to transmit user spa data via an interface of the spa unit 120, and the spa unit 120 may transmit such user spa data to the spa type selector 151. In an additional implementation, the spa data storage server 130 can transmit user spa data to the spa type selector 151. The spa data storage server 130 may retrieve, from a data store (e.g., spa characteristics data store 131), user spa data including any and/or all of the data described herein. In addition, the spa data storage server 130 may include additional data in the user spa data, such as a schedule with intended dates and/or times for use extending for one week, two weeks, and/or more.

In another implementation, the spa data storage server 130 receives user spa data from a user device 102. In another implementation, a user can transmit user spa data from an interface of a user device 102 to the spa unit 120 and/or the spa data storage server 130.

The spa type selector 151 may select a spa model based on the user spa data at (2). Additionally and/or alternatively, the spa type selector 151 may select a heating curve representing a specific spa unit 120 model's heating characteristics based on the user spa data. For example, the spa type selector 151 can select a heating curve for a spa unit 120 based on user data comprising the spa unit 120 model, an insulation coefficient, the R-value of the spa unit 120, whether the spa unit 120 has a cover, the pump 125 characteristics of the spa unit 120, an estimated volume of the spa unit 120, the spa water temperature, and/or the heater 124 characteristics of a spa unit 120. Additionally, a custom spa unit 120 heating curve may be calculated by the spa type selector 151 based on one or more of the user spa data mentioned herein. Alternatively, the spa type selector 151 can determine a custom heating curve for a spa unit 120 by determining the R-Value of the spa unit 120 based on the user spa data. In an example implementation, the heating curve for each spa unit 120 model, including each spa unit 120 model's calculated R-value, is saved in a database and retrieved by the spa type selector 151 based on the user spa data. In another example implementation, the spa model selector 151 determines a heating curve for the user's spa unit 120 based on the model number and/or serial number of the spa unit 120.

Once the spa type selector 151 has selected and/or calculated a heating curve for the spa unit 120, the spa type selector 151 can transmit the spa model information, the user spa data, and/or a heating curve to the schedule processor 152 at (3).

In an example implementation, ambient temperature data can be transmitted from an ambient temperature data store 140 to the schedule processor 152 at (4). The ambient temperature data transmitted can be based on the user location information as described herein. In an alternative implementation, the schedule processor 152 requests ambient temperature data from an ambient temperature data store 140 after the schedule processor 152 receives the transmitted selected spa model information, the user spa data, and/or the heating curve from the spa model selector 151.

The schedule processor 122 can extract the received user spa data, the determined spa model, and/or the spa heating curve from the spa model selector 151 to determine a custom R-Value for the spa unit 120 at (5). The spa model information, user spa data, and/or heating curve, along with the ambient temperature data can be, for example, a set of instructions and/or coefficients used by the schedule processor 152 to determine an approximate heating schedule for a user's spa unit 120.

The schedule processor 152 can then estimate a lead time for the spa unit 120 to reach the use temperature based on the received user spa data at (6). A lead time can be determined by, for example, the heater curve of the spa unit 120. In an example implementation, the schedule processor 152 may calculate that a lead time of 1, 2, 5, and/or 10 hours or any other duration of time may allow for the water in the spa unit 120 to heat from a first temperature to the use temperature.

Additionally, the schedule processor 152 may apply an early arrival time to the estimated lead time as described herein.

The schedule processor 152 may also calculate a time gap between the intended use of the spa unit 120 based on the transmitted user spa data at (7). The time gap between use can be a combination of, for example, a duration of time where the spa unit 120 may not be used, and/or a duration of time between the ending of a user's intended use and the start of a next heating curve for the next intended use. In an example implementation, the time gap may be zero for a user who intends on using the spa unit 120 three or four times per week. If, for example, the time gap is zero, the schedule processor 152 may indicate that the spa unit 120 should be operating in a standby operating mode. Additionally and/or alternatively, if a user intends to enjoy a spa unit 120 once or twice per week, the spa unit 120 time gap may exist such that the spa unit 120 should be operated in an automated temperature operating mode.

The schedule processor 152 may then determine a spa run schedule using the estimated lead time for the spa to reach the use temperature at (8). The determined spa run schedule can be, for example, a list of instructions and/or executable code to be executed by the spa unit 120. The schedule processor 152 may transmit the estimated spa run schedule to an energy efficiency estimator 153 at (9). The energy efficiency estimator 153 may receive the estimated spa run schedule and/or user spa data, and calculate, for example, an estimated energy savings for the spa unit 120 at (10). The energy efficiency estimation for the spa may be, for example, a percentage of savings by operating a spa unit 120 in the automated temperature operating mode compared to operating the spa unit 120 in a standby operating mode. Alternatively or in addition to a percentage, the energy efficiency estimation of the spa unit 120 may be a dollar amount in savings per day, per week, per month, etc. In an example implementation, the energy efficiency estimator 153 can use the ambient temperature data transmitted from the schedule processor 152 to determine an estimated energy savings.

The energy efficiency estimator 153 can transmit a set of instructions to the user device 102, the spa unit 120, and/or the spa data storage server 130 at (11). The set of instructions can be, for example, computer-executable code instructing the spa unit 120 to run according to the determined spa run schedule along with data comprising an indication of the estimated energy savings for the spa unit 120 by operating the spa unit 120 in an automated temperature operating mode. In an example implementation, the energy efficiency estimator 153 transmits the spa run schedule and estimated energy savings to the user device 102 via a network, such as network 110, where an interface of the user device 102 may display the estimated energy savings. Alternatively or in addition, the user device 102 may further transmit the spa run schedule to the spa unit 120 such that the spa unit 120 controller 121 energizes the heater 124 and/or pump 125 in a manner that allows the spa water temperature to reach a use temperature per the determined spa run schedule.

Example Spa Unit

Figure 3:
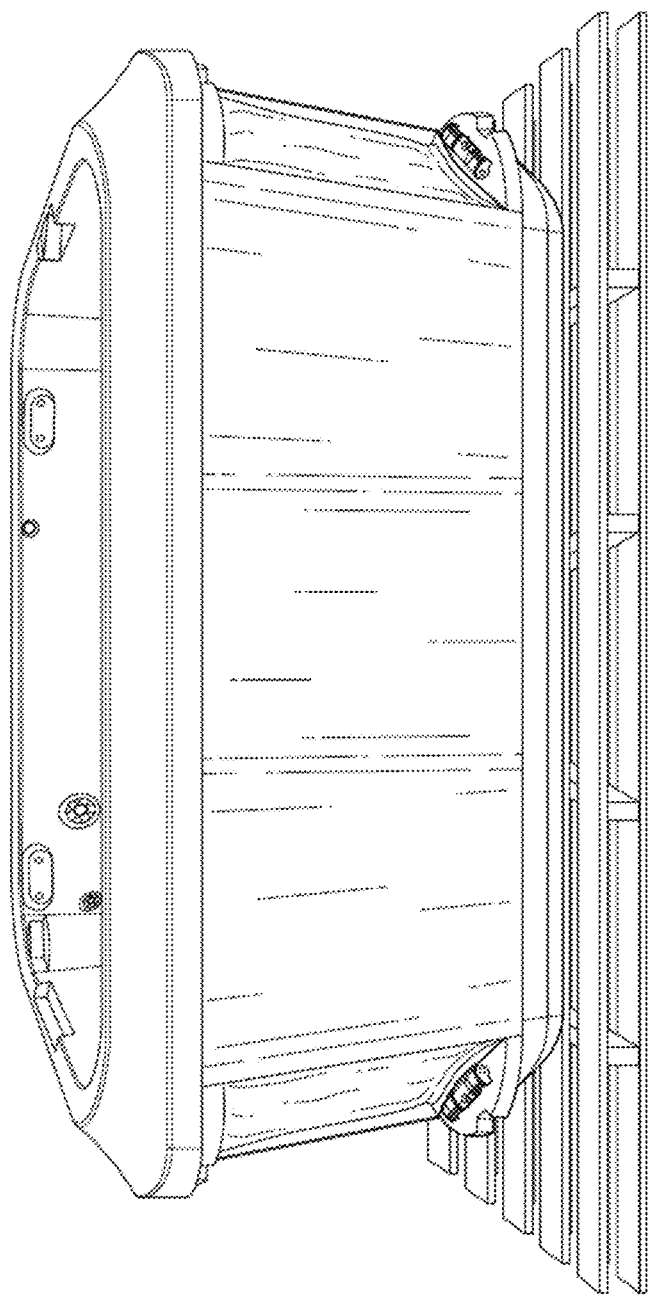
FIG. 3 illustrates an example embodiment of a spa unit, according to one embodiment.

FIG. 3 illustrates an example implementation of a spa unit 300. A spa unit 300 can include a spa controller electrically connected to memory and a communication unit. Additionally, a spa unit 300 can include one or more heaters mechanically connected to a pump such that when water from the spa is circulated through the pump, the water can be heated as well. Further, the spa unit 300 controller may be electrically connected to the pump and heater such that the controller may energize and/or deenergize the pump and/or heater. Additionally, the spa unit 300 can include one or more instruments electrically connected to the spa controller. The instruments can include, for example, a temperature sensor, a leak detector, a limit stitch, and/or a level indicator.

Example Spa Automated Temperature Operating Mode Selector Routine

Figure 4:
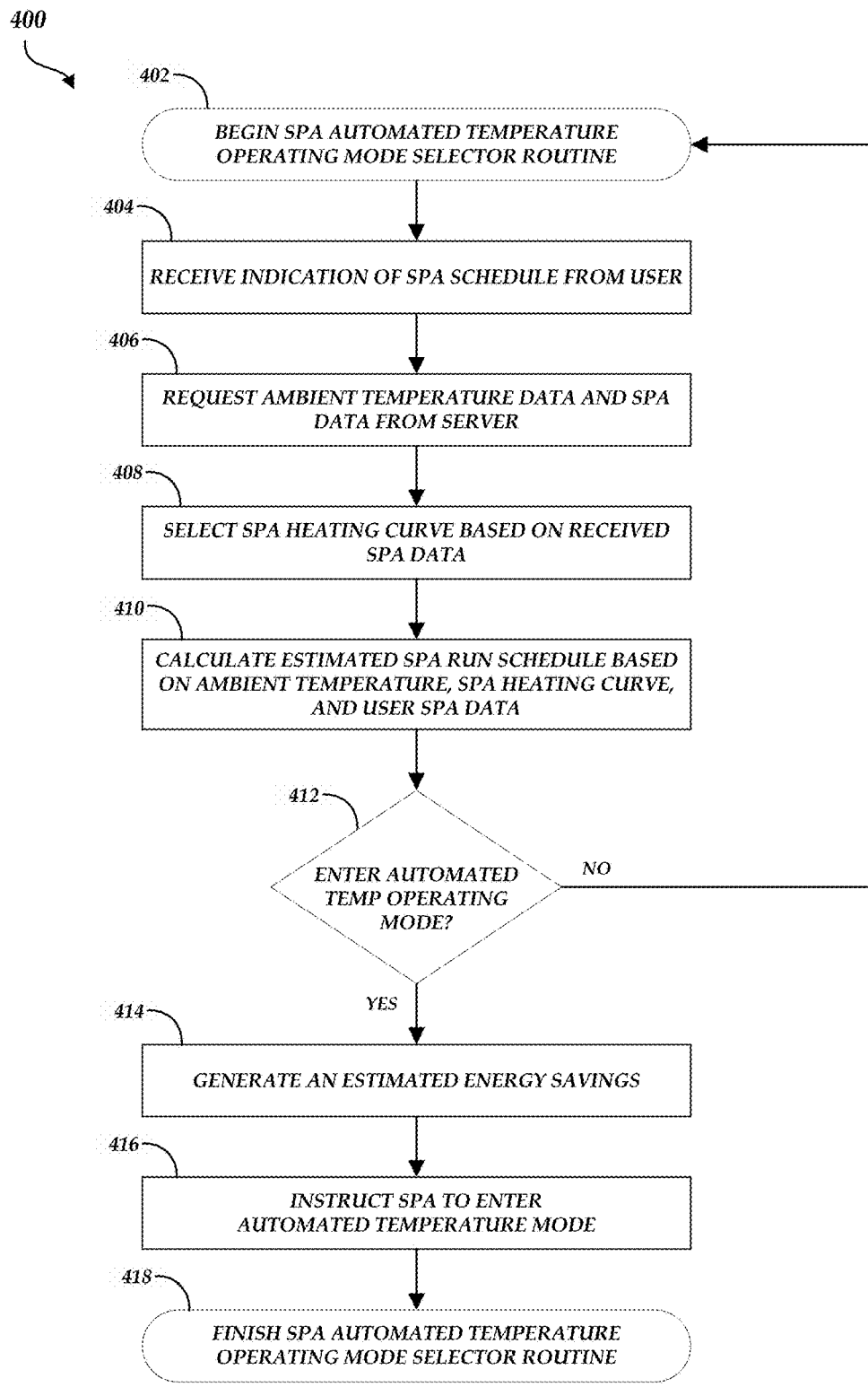
FIG. 4 is a flow diagram depicting an example, spa automated mode selector routine, according to one embodiment.

FIG. 4 is a flow diagram depicting an example spa automated temperature operating mode selector routine 400 illustratively implemented by an automated temperature estimator system 150 according to one embodiment. As an example, the automated temperature estimator system 150 of FIG. 1 (e.g., the spa type selector 151) can be configured to execute the automated temperature operating mode selector routine 400. In an example implementation, the following routine 400 may be executed if a user at block 610 of FIG. 6, answers "yes" to the question: "Do you want to Save Energy and $?" The automated temperature operating mode selector routine 400 begins at block 402.

At block 404, a spa type selector may receive an indication representing an intended spa use schedule from a user. For example, the spa type selector 151 can receive user spa data (e.g., representing a user's intended schedule and/or use temperature) from a user device 102. Additionally and/or alternatively, a spa type selector 151 can receive user spa data from a spa unit 120 and/or a spa data storage server 130. The user spa data can include, for example, any or all of the user data defined herein. Alternatively, the spa type selector 151 can be an application programming interface (API) implemented on a user device 102, where a user may input user spa data directly to the spa type selector 151.

At block 406, a request for ambient temperature data and spa data is initiated. In an example implementation, data representing the user spa data is transmitted from a spa type selector 151 to a schedule processor 152, where, upon receiving the user spa data, the schedule processor 152 requests and receives ambient temperature data from a server (e.g., the spa data storage server 130).

At block 408, the schedule processor 152 may further request additional spa data from a server depending on type of user spa data received by the schedule processor 152. In an example according to the illustrated embodiment, if the received user spa data indicates a spa use temperature and a date and time of intended use, the schedule processor 152 may request additional user spa data information form a server, such as the specific spa's heating curve and/or any other user spa data described herein.

At block 410, a schedule processor 152 can calculate an estimated spa run schedule based on the received ambient temperature from a server, the received spa heating curve, and/or the user spa data. The estimated run schedule can be, for example, based on the specific user's spa characteristics and the user's intended use schedule, as defined herein.

Once the schedule processor 152 calculates an estimated spa run schedule, the schedule processor may, for example, determine whether the spa unit 120 would operate more efficiently by entering an automated temperature operating mode instead of remaining in the current operating mode, as shown at block 412.

In an example implementation, the schedule processor 152 may determine whether to enter the automated temperature operating mode based on a user's use preferences. For example, for a user who enjoys the spa unit 120 one or two times per week, the schedule processor 122 may determine that the spa unit 120 will operate more efficiently in an automated temperature operating mode. As a result, the automated temperature operating mode selector routine 400 may proceed to block 414. Efficiency can be calculated, for example, based on energy consumption of the estimated spa run schedule while operating in an automated temperature mode in comparison with the energy consumption of a standby operating mode as described herein. In an additional example, for a user who enjoys the spa unit 120 four or more times per week, the schedule processor 152 may determine that the spa unit 120 likely will not achieve an energy savings whether operating in the automated temperature operating mode or the standby operating mode. If the schedule processor 152 determines that operating in an automated temperature operating mode does not provide the user with an energy efficiency savings, the automated temperature operating mode selector routine 400 may proceed back to block 402.

In the example embodiment, if the schedule processor 152 determines that there is an efficiency gained by operating in an automated temperature operating mode, the schedule processor 152 may transmit the estimated spa run schedule data to, for example, an energy efficiency estimator 153.

At block 414, an energy efficiency estimator 153 can generate an estimated energy savings for the user based on entering an automated temperature operating mode. The energy efficiency estimator 153 may transmit the estimated energy savings to, for example, an external device 102. In another implementation, the energy efficiency estimator 153 may be an API on an external device 102, having an interface that displays to a user the estimated energy savings when operating in the automated temperature operating mode. Additionally and/or alternatively, the spa type selector 151, the schedule processor 152, and/or the energy efficiency estimator 153 can be a single device and/or routine implemented as an API on an external device 102, spa unit 120, and/or an external server such as spa data storage server 130.

At block 416, the energy efficiency estimator 153 may transmit instructions to the spa unit 120 to enter the automated temperature operating mode. The transmitted instructions can be in the form of executable code received by the spa unit 120. After the energy efficiency estimator 153 transmits instructions to the spa unit 120 to enter automated temperature operating mode, the spa automated temperature operating mode selector routine 400 proceeds to block 418 and ends.

In an additional embodiment, the spa automated temperature operating mode selector routine 400 can be run periodically, without interaction by the user and based on the user's use of the spa. Additionally, the run schedule can be updated in real-time (e.g., within a few seconds of the user using the spa, of the user providing a use schedule or a change to a use schedule, etc.) based on a user's input and/or changes to the user's intended use schedule. Further, in an additional implementation, the spa unit 120 may incorporate changes in weather patterns into the spa run schedule to determine the most efficient consumption of energy to achieve the user's desired schedule. Additionally and/or alternatively, the spa unit 120 may utilize artificial intelligence to predict not only the user's schedule, but also when the user's schedule should be determined. The automated temperature estimator system 100 can train (e.g., reinforce) an artificial intelligence model to learn, for example, temperature and usage patterns to determine a user's optimum schedule. Further inputs that may be incorporated into the training data used to train the artificial intelligence include a utility provider's energy rate (kilowatts per hour cost of energy) and/or peak operating cost hours (e.g., utility provider data). In response to receiving input data corresponding to a user's usage pattern and/or desired use temperatures and/or utility company data, the artificial intelligence model may output a, suggested run schedule.

Example Graphical User Interface

FIGS. 5A-5H are illustrative examples of a GUI used to select a spa run schedule. For example, the GUI may be used to select the spa run schedule of a spa unit 120, as depicted in FIG. 2. FIGS. 5A-5H may be stored, rendered, and/or presented to a user by one or more user devices 102. Selections by the user may be transmitted to the automated temperature estimator system 150.

Figure 5B:
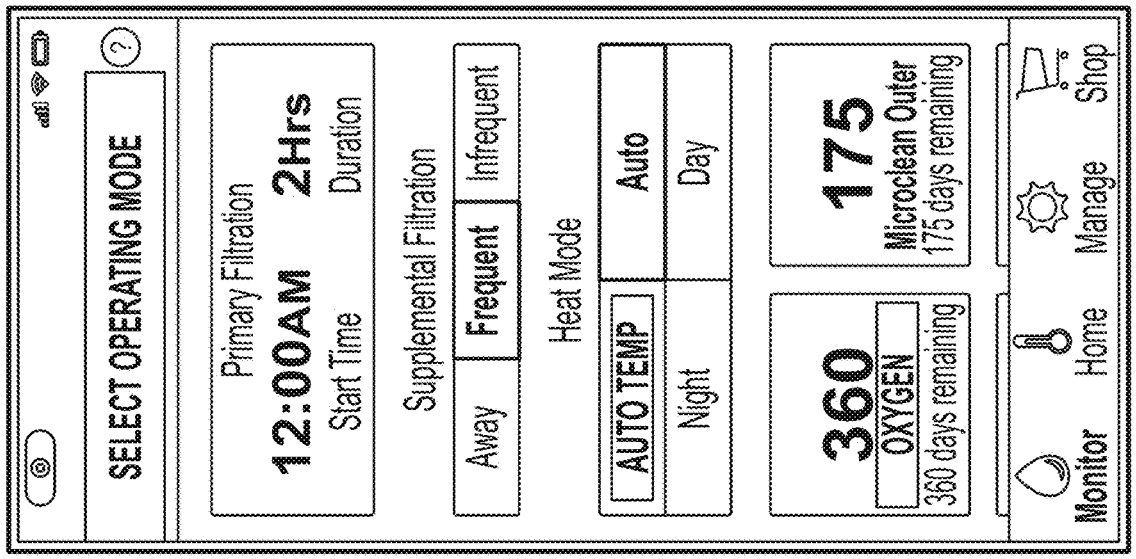
Figure 5A:
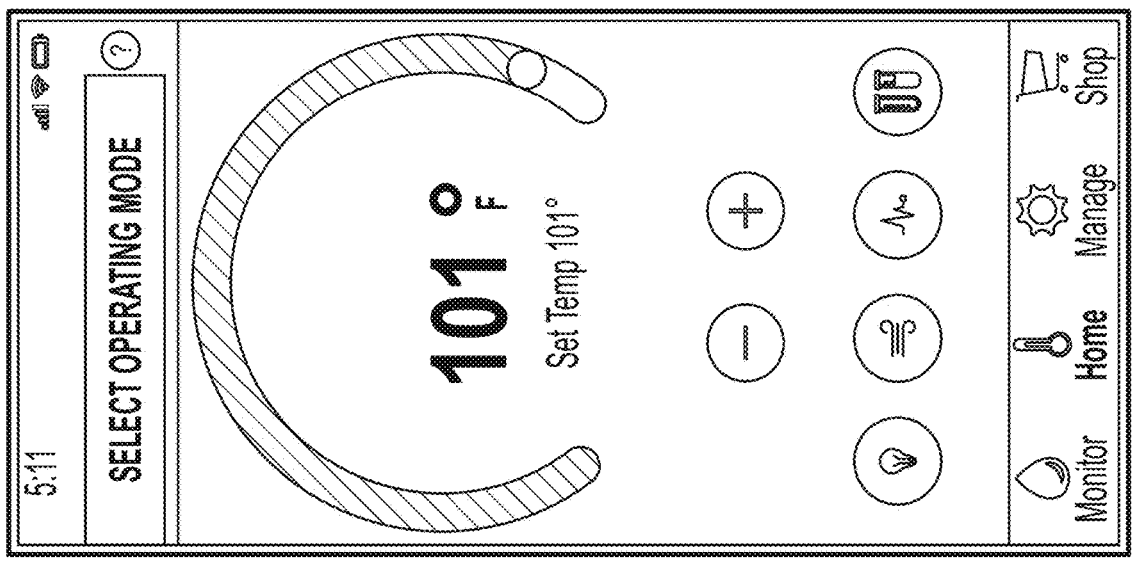

As illustrated in FIG. 5A, the GUI includes a home screen, presenting the user with one or more spa characteristics as described herein, as well as an icon enabling the user to enter or select an operating mode. The user may select, for example, the "monitor" icon indicating to the external device that the user wishes to view and select an operating mode.

As illustrated in FIG. 5B, the GUI includes a screen depicting different selections and properties of the spa unit 120. For example, the screen may present the user with an estimated time remaining before a water filter change is required, a selection of one or more operating modes, and/or a filtration run schedule. The user desiring to operate the spa unit 120 in an automated temperature operating mode may select, for example, "AUTO TEMP."

Figures 5C, 5D:
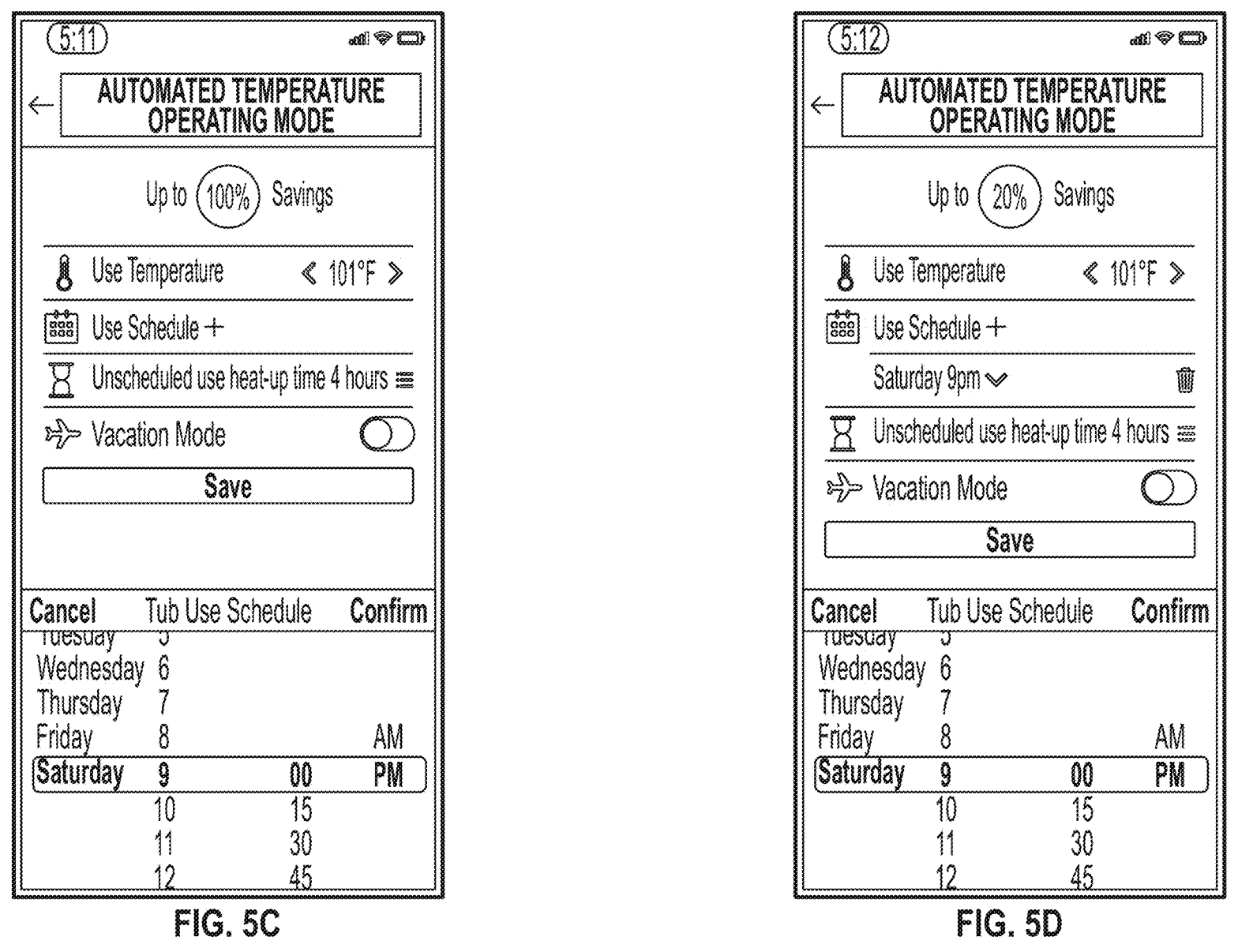
Figure 5F:
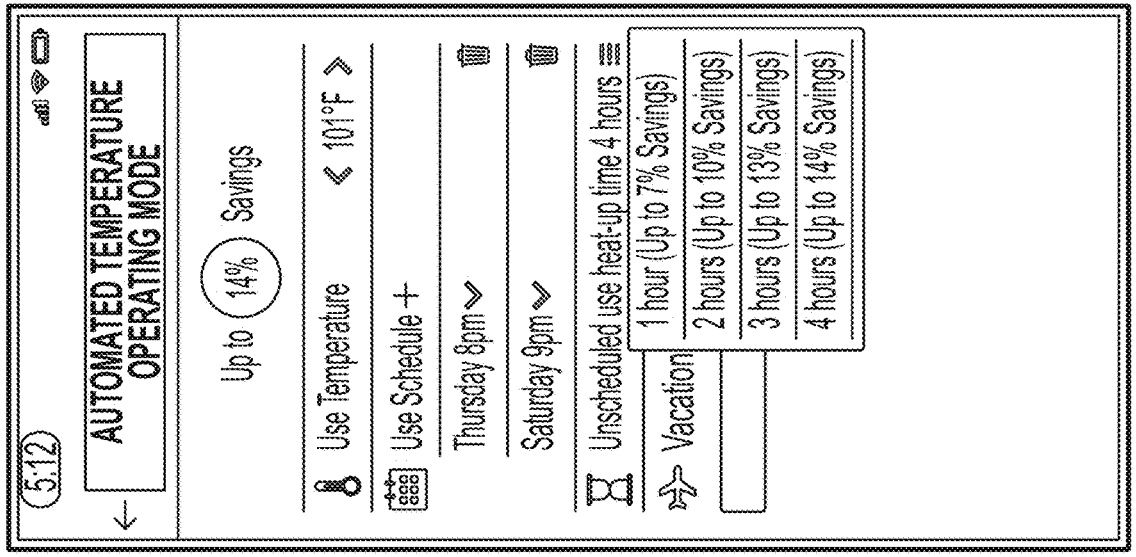
Figure 5E:
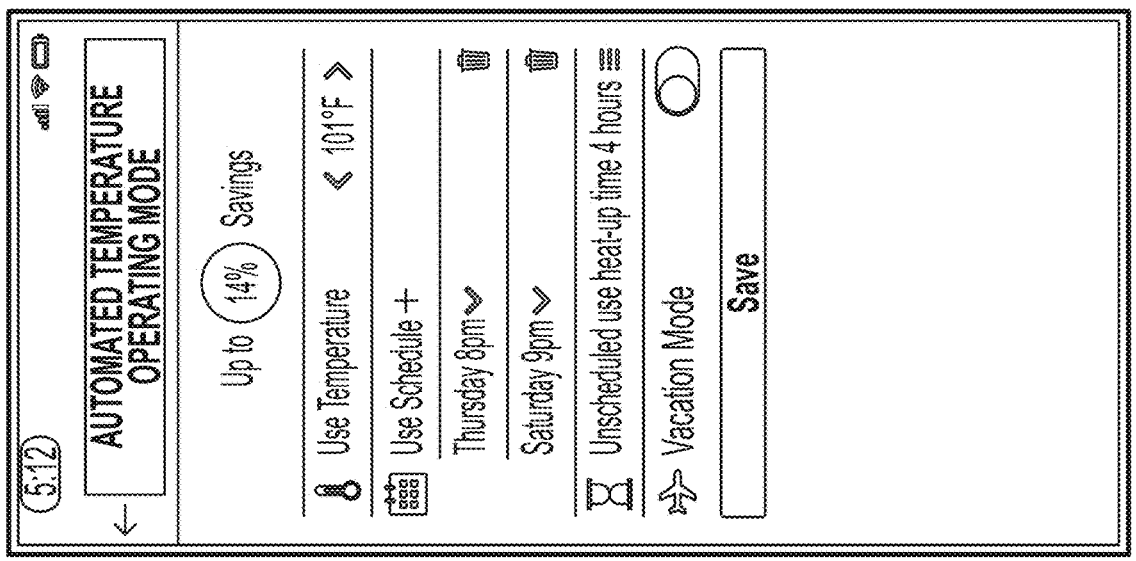

As illustrated in FIGS. 5C-5E, the GUI includes a screen presenting the user with one or more selections for the automated temperature operating mode. For example, the user may select user data such as the use temperature of the spa unit 120 and the spa run schedule. Additionally, the user may enable a vacation mode. In the example GUI, the user may select "Use Schedule +" to add one or more times to use the weekly spa use schedule. Once selecting the "Use Schedule +" icon, the user is prompted at the bottom of the screen with scrollable fields to select a time including days of the week, hours, minutes, and whether the time is AM or PM. Once the user enters their time and presses confirm, the user's time is placed under the "Use Schedule +" icon. In the example illustration, the user's first time is Thursday at 8 pm. The user may select the "Use Schedule +" icon again and enter a second time to be included in the run schedule. The second time may appear under the first time. In the present example, the second time is Saturday at 9 pm.

As illustrated in FIG. 5F, the GUI includes a screen presenting the user with a selection for the "Unscheduled use heat-up time." The GUI may present the user with a selection for determining the heating curve of a spa for unscheduled use. The spa unit 120 may be heated from an initial temperature to the use temperature following one of four heating curves. In the example illustration, there are four heating curves of 1, 2, 3, and 4 hours. Each heating curve has a relative energy savings included. Once the user determines an unscheduled use heat-up time, the user may select "save" to enter the automated temperature operating mode. Once the user selects "save," the user device 102 may transmit the spa user data to the spa type selector 151, as illustrated in FIG. 2.

Figure 5H:
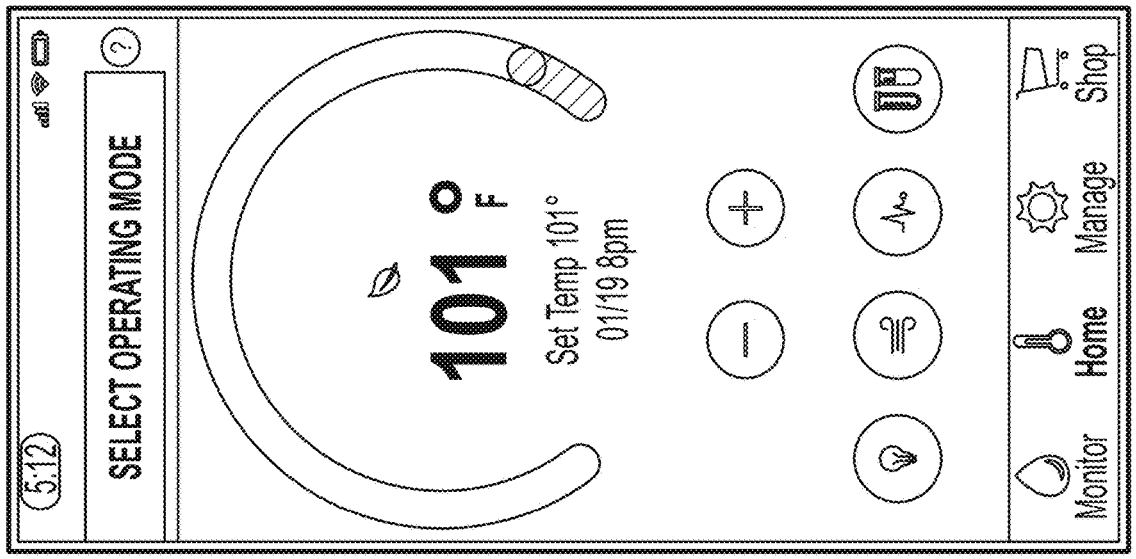
Figure 5G:
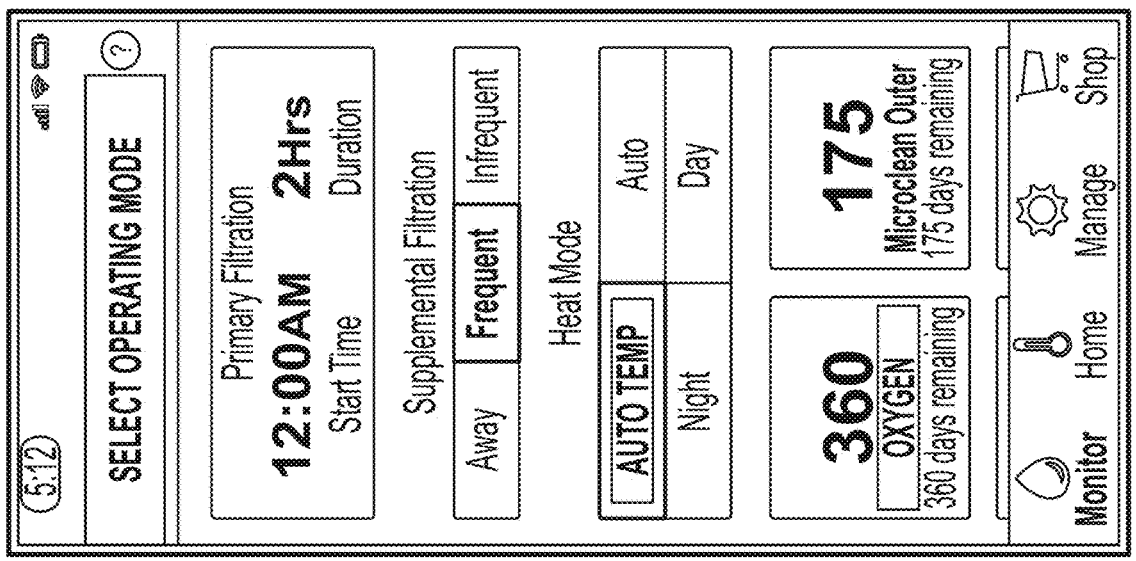

As illustrated in FIG. 5G, the GUI includes a screen displaying the current mode of the spa unit 120. The current mode of the spa unit 120 may be received by the user device 102 in response to transmitting spa user data to the automated temperature estimator system 150. Additionally, the user device 102 may receive an indication that the spa unit 120 has entered an automated temperature operating mode from, for example, controller 121 in response to the automated temperature estimator 150 determining a run schedule of the spa unit 120.

As illustrated in FIG. 5H, once the GUI has presented the user with a screen indicating that the spa unit 120 is operating in an automated temperature operating mode, the user may select the home icon, where the GUI presents the user with the home screen. The home screen of FIG. 5H differs from the home screen of FIG. 5A in that a green leaf is depicted above the spa use temperature as an indication that the spa unit 120 has entered the automated temperature operating mode.

Additional Embodiments

Figure 6:
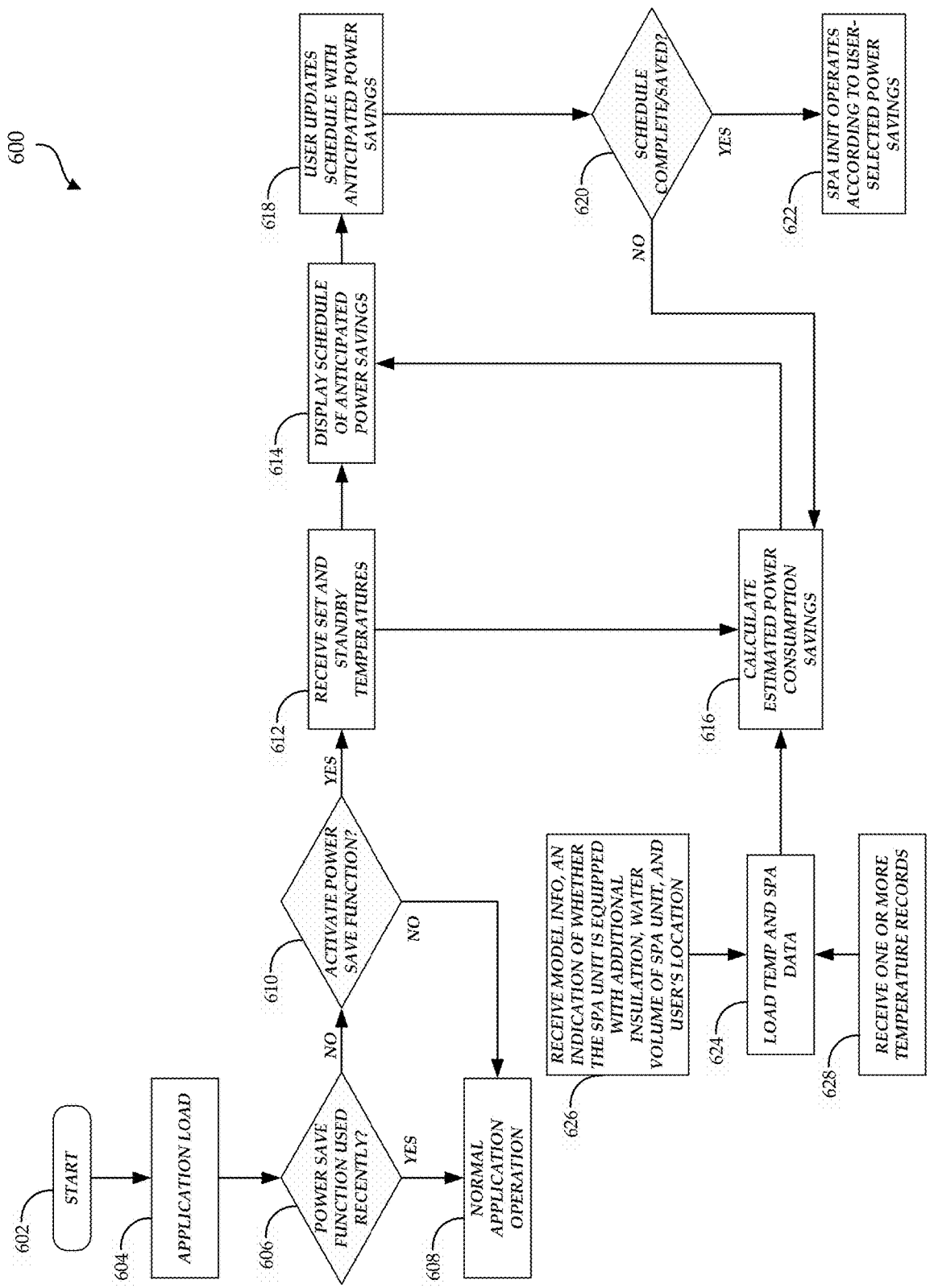
FIG. 6 is a process flow diagram of an example method 100 for regulating the temperature of a spa using an automated temperature control system.

FIG. 6 is a process flow diagram of an example method 600 for regulating the temperature of a spa using an automated temperature control system. The method 600 can be implemented, for example, by an application running on a smartphone or other handheld device (e.g., a user device 102), the spa unit 120, and/or the automated temperature estimator system 150.

The method 600 starts at block 602 where an application, such as a smartphone application, is loaded, as shown in block 604. At block 606, the application will determine whether a power saving function of a spa unit or hot tub has been used recently. If the power saving function has not been used recently, the application can determine for how long the power saving function has not been used (e.g., one month, two months, three months, etc.). If the power saving function has not been used recently, the application can display a normal operation interface, as shown in block 608. If the power saving function has been recently used (e.g., in the last week, month, etc.), then the application can display an interface asking if the user wants to activate the power saving function, as shown in block 610.

The power saving function can include setting up a temperature control schedule for the spa unit or hot tub. At block 612, the user can schedule a predefined temperature for the spa unit or hot tub (e.g., 102 degrees F.) at a predefined time and date (Friday, at 8:00 PM). This can ensure that the spa unit or hot tub is at the user-selected temperature at the user selected date and time. The user can also select a standby temperature of the spa unit or hot tub. The power saving function can also include choosing the predefined period of time it will take the spa unit to heat the spa unit or hot tub to the user-selected temperature (e.g., 1 hour, 2 hours, 3 hours, 4 hours, etc.). The power saving functions can also include a vacation mode which, when activated, disables all heating functions of the spa unit or hit hub indefinitely until the vacation mode is activated. Depending on the user selected power saving functions, the application can display an interface with a schedule of anticipated power savings, as shown in block 614.

The anticipated power consumption savings can be calculated based at least in part on the spa unit or hot tub model, whether the spa unit or hot tub has been equipped with additional insulation (e.g., a winter package), the water volume of the spa unit or hot tub, and the user's location, as shown in block 626. Additionally, and based on the user's location (e.g., zip code), the anticipated power consumption savings can also be calculated based at least in part on at least four temperature records including average daily, winter, spring, summer, and fall temperatures for a specific zip code or location that can optionally be obtained via an application programming interface (API) call to a temperature service, as shown in block 628. The information collected on blocks 626 and 628 can be loaded into the application, as shown in block 624, where a processor (e.g., calculator, the energy efficiency estimator 153, etc.) can calculate the estimated power consumption savings, as shown in block 616. The estimated power consumption savings, as calculated by the processor shown in block 616, can be displayed, for example, as a percentage of power consumption savings, an estimated dollar value, a unit of measure (e.g., kilowatts), or a combination thereof.

The power consumption savings can represent a live estimate of anticipated savings, as shown in block 618. That is, if the user updates the power saving functions, as shown in block 612, the application will update the anticipated power consumption savings to accurately display the new anticipated saving based on the newly selected energy savings functions. Once users finish selecting their desired energy savings functions, as shown by block 620, the selected power saving functions can be communicated to the processor in block 616 which can update the estimated power consumption savings based on the information of block 626 and 628. At block 622, the spa unit or hot tub can operate according to the user-selected energy or power savings functions.

Figure 7B:
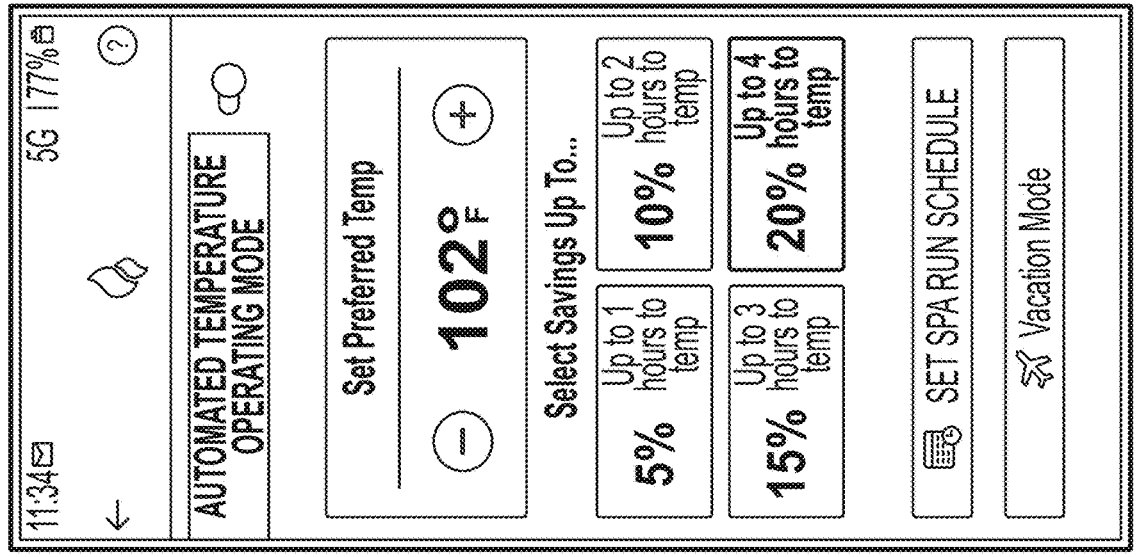
FIGS. 7A-7I show examples of an application interface for implementing a power consumption saving mode.
Figure 7A:
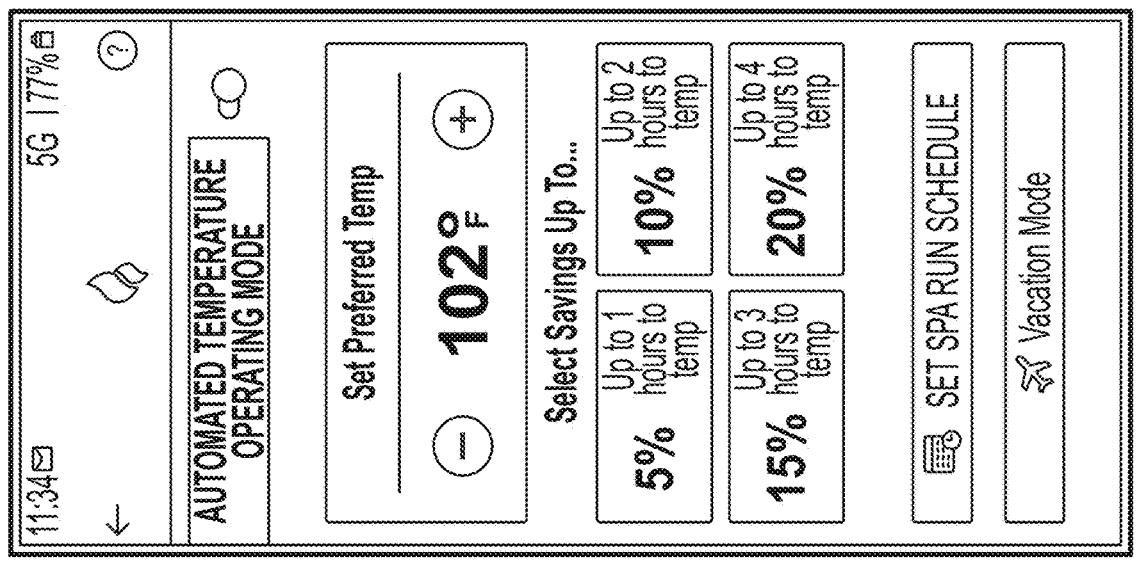
Figure 7D:
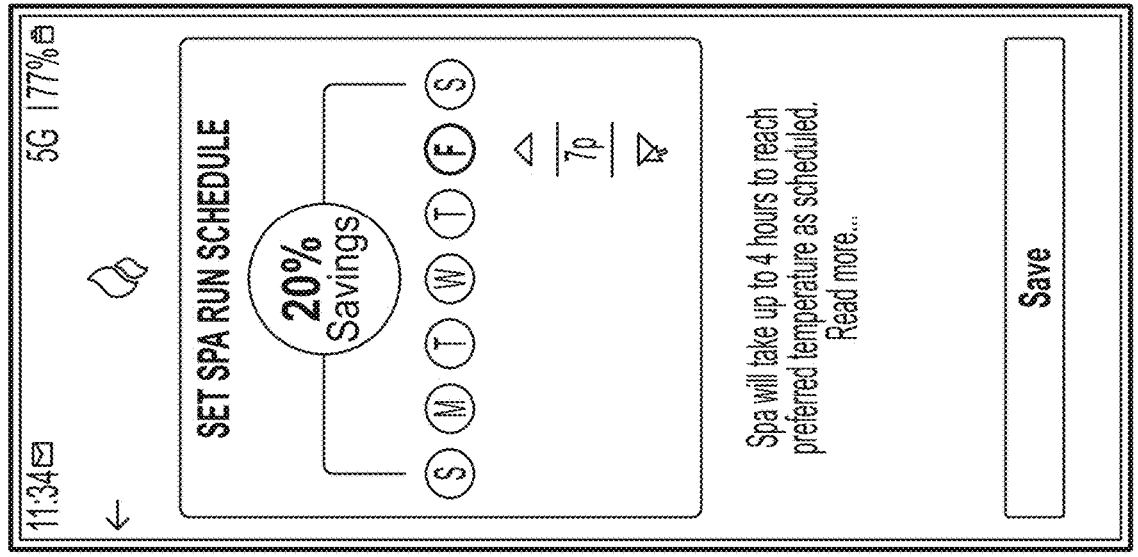
Figure 7C:
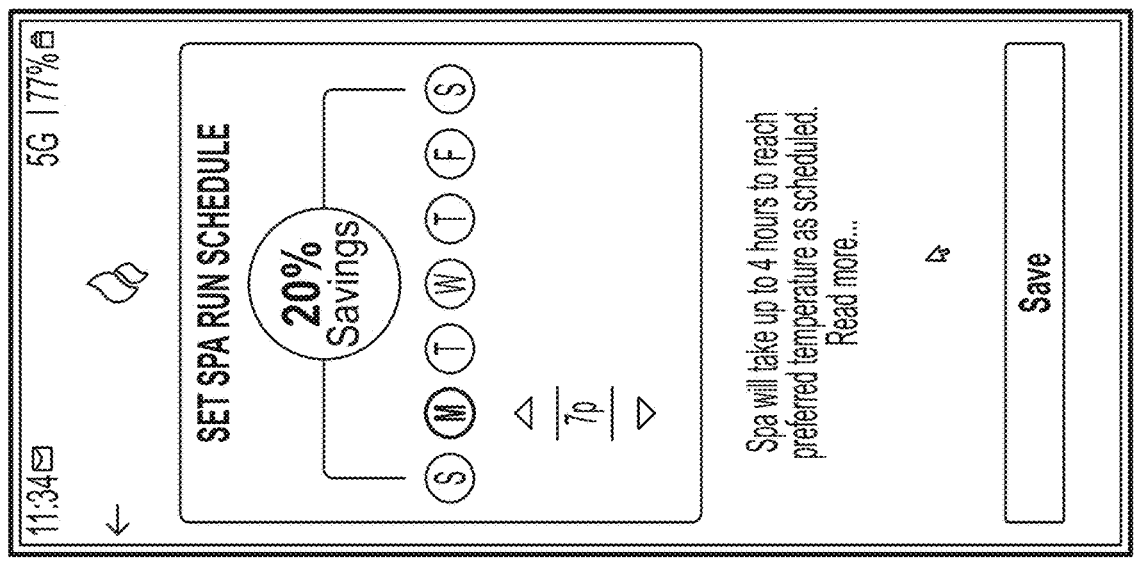
Figure 7F:
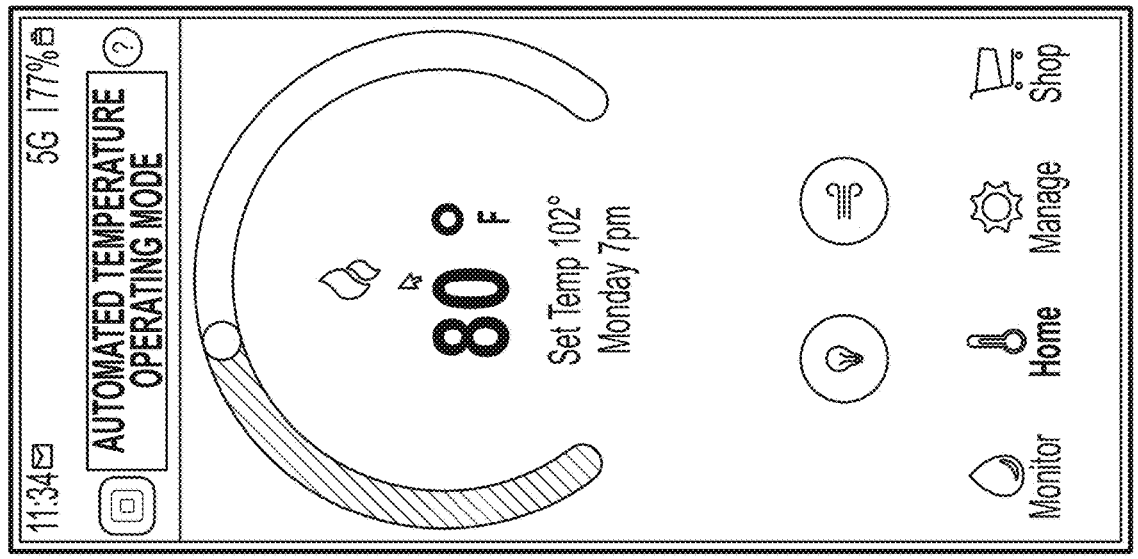
Figure 7E:
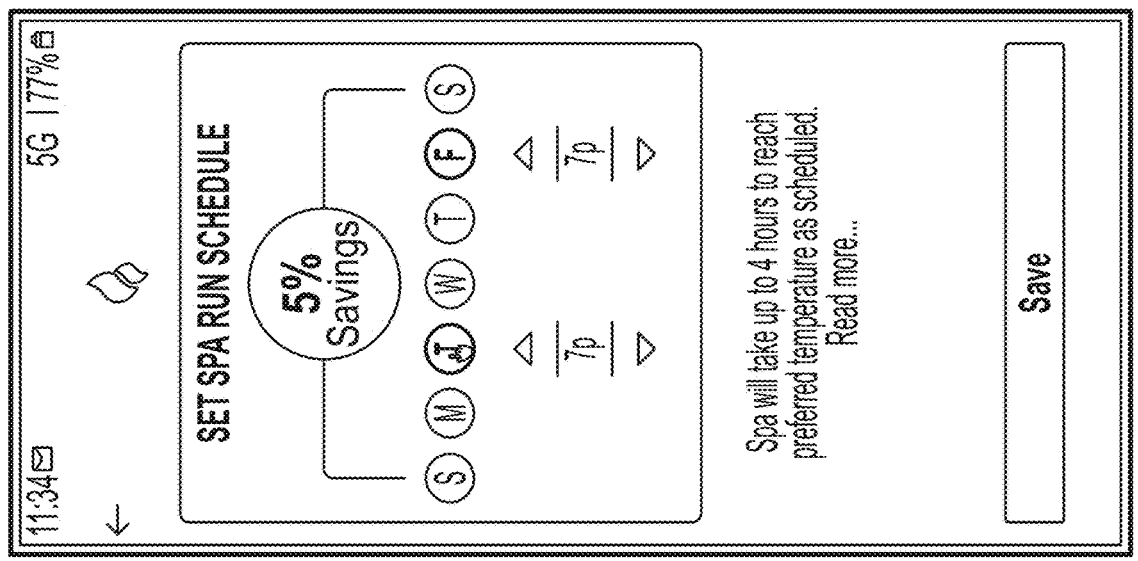

FIGS. 7A-7I show other examples of an application interface applying the energy method 600. As shown in FIGS. 7A and 7B, a user can select a temperature for the spa unit or hot tub, the user's desired energy saving percentage, setting a temperature schedule, and/or activating the vacation mode. At the temperature schedule screen, as shown in FIG. 7C, users can select one or more days and times when the spa unit will reach a predefined temperature. For example, the user may select Friday and 7:00 PM, as shown in FIG. 7D, or Tuesday and Friday at 7:00 PM, as shown in FIG. 7E. The temperature schedule screen can also display a power consumption saving estimate (e.g., 20%).

Figure 7H:
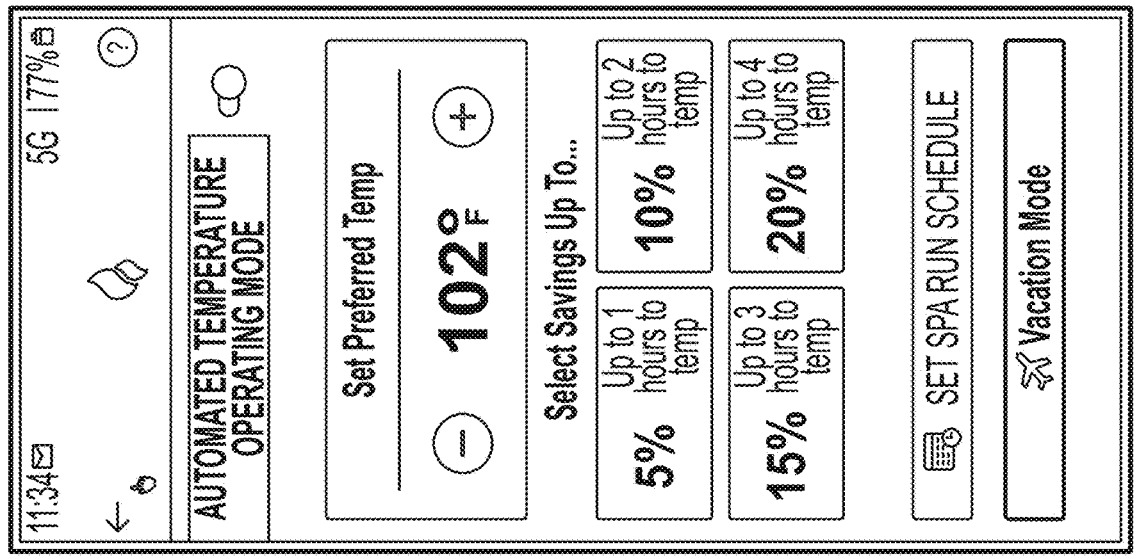
Figure 7G:
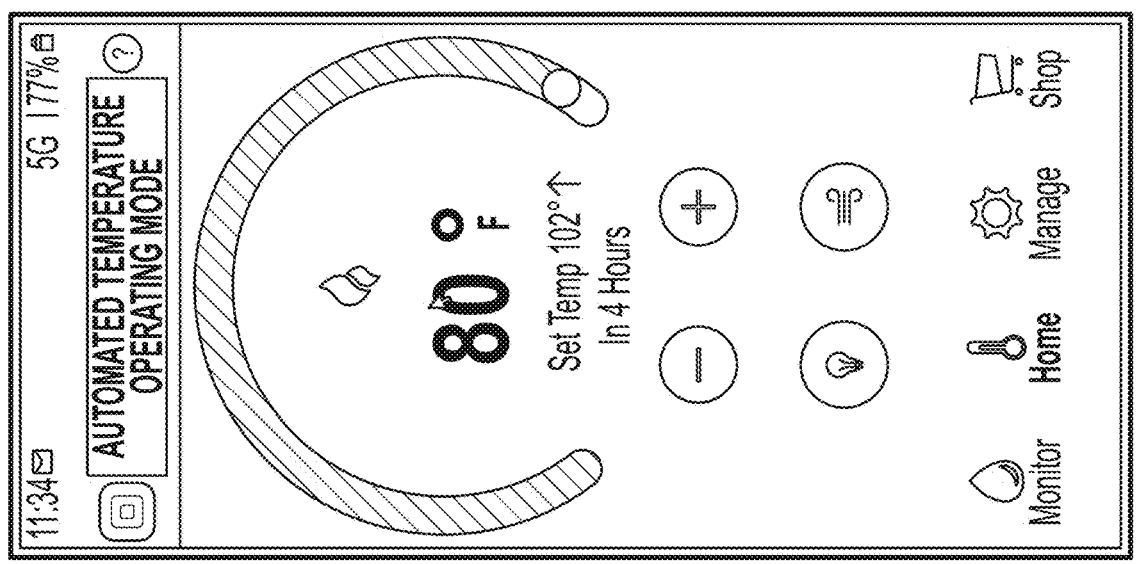
Figure 7I:
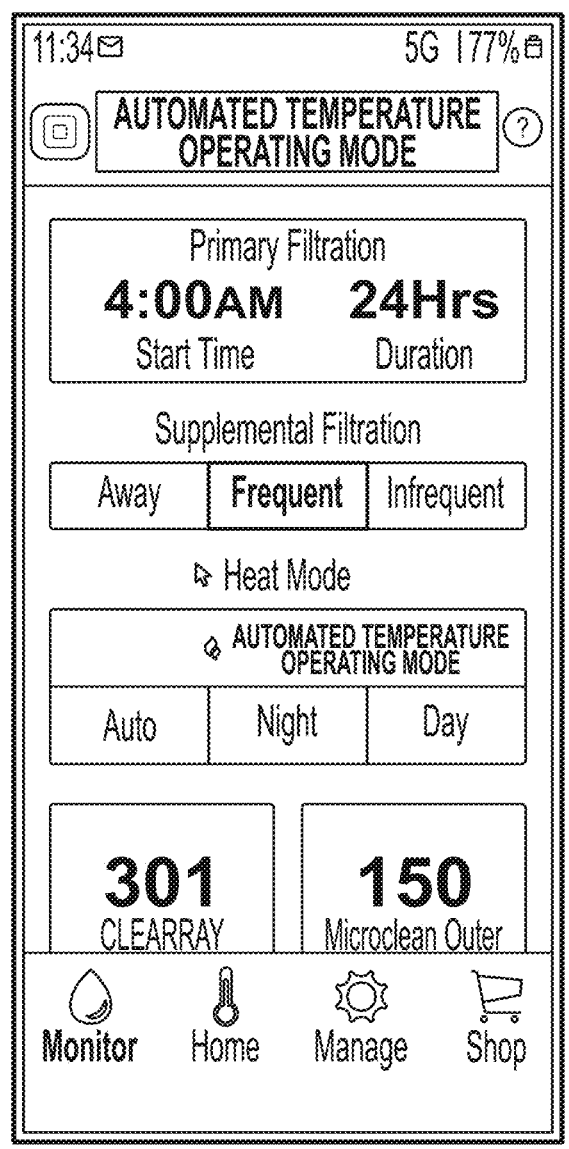

As shown in FIG. 7F, a screen can display the user-selected power saving functions. For example, the screen can display the user-selected temperature and/or the date and time such temperature will be achieved. A color and/or a symbol can provide an indication to the user whether the application is in a power saving mode. For example, and as shown in FIG. 7F, the screen can display a green color and a green symbol thus indicating that the application is in a power saving mode. Alternatively, the screen can display an orange color and a white symbol thus indicating that the application is not in power saving mode. As shown in FIG. 7H, the application can provide an indication that the vacation mode is activated. The application can also provide a status of the components of the spa unit or hot tub, such as the filtration system and the heat mode, as shown in FIG. 7I.

In further embodiments, users can benefit from power consumption savings notwithstanding the average temperature where the spa unit or hot tub is located. In some cases, using the automated temperature control systems and methods described herein can reduce energy consumption by up to 25%. A "soak ready" mode can ensure that the spa unit or hot tub is at a user-selected temperature at a user-selected date and time. In some cases, the automated temperature control system can also inform users about estimated "off-peak" and "peak" power consumption costs. In the vacation mode, spa unit or hot tub can automatically drop the temperature and shorten the duration of the filtration cycles.

Figure 8A:
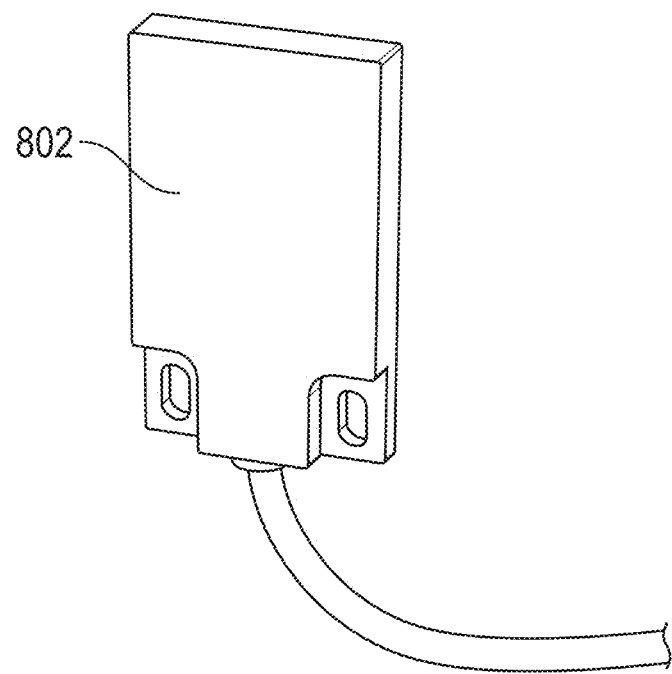
FIGS. 8A-8B show additional features of the automated temperature control systems and methods described herein, and the spa units or hot tubs associated with them.
Figure 8B:
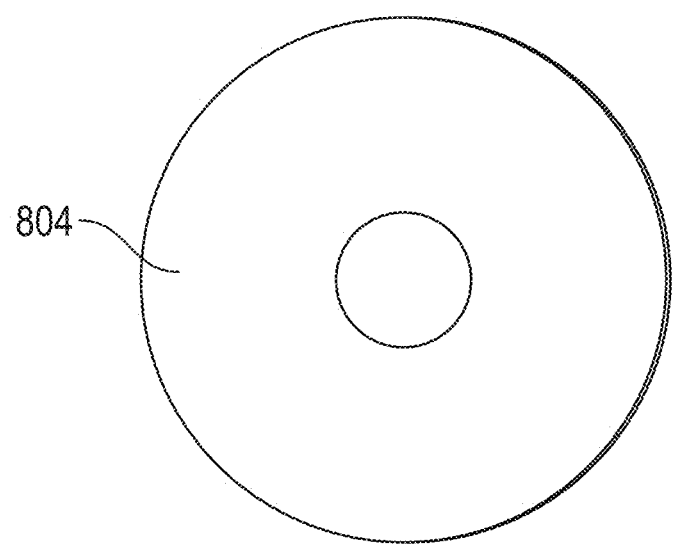

FIGS. 8A-8B show additional features of the automated temperature control systems. In some cases, as illustrated in FIG. 8A, a fill/drain sensor 802 can detect the water level inside a receptacle of a spa unit or hot tub. The fill/drain sensor 802 can be a capacitive sensor. The fill/drain sensor can provide alerts to users about the water level (e.g., low level, overflow level) inside the spa unit or hot tub. In some cases, a spa unit or hot tub can include one or more of a fill/drain sensor 802. For example, a first fill/drain sensor can be positioned on an interior portion of the spa receptacle close or near the base of the spa unit, and a second fill/drain sensor can be positioned on an interior portion of the spa receptacle closer or near an upper edge of the spa unit. The first and second fill/drain sensors can detect if the water level is above or below the sensor.

As illustrated in FIG. 8B, the system can also include a leak detection sensor 804 which can provide alerts and/or an indication to users that the water inside the spa unit or hot tub is leaking. The leak detection sensor can be positioned at or near the electronics equipment area of the spa unit. The leak detection sensor 804 can detect moisture/and or liquids. Upon detecting moisture and/or a liquid, the leak detection sensor 804 can communicate with control unit of the spa unit and/or a device of a user (e.g., a cellphone) and provide an alert and/or indication that the leak detection sensor 804 has detected the presence of moisture and/or a liquid. The alerts and/or indications can be transmitted to a user device, such as a cellphone, using Bluetooth low energy (BLE) technology. Beneficially, any of the sensors described herein can be included as part of a sensor kit having one or more sensors that spa users can easily install to existing spa units to add functionality and convenience to the operation and/or maintenance of the spa unit or hot tub.

Spa Cover Detection-Based Temperature Control

In further embodiments, the automated temperature estimator system 150 can send to the spa unit 120 an instruction to raise or lower the spa unit 120 water temperature based on a position of a cover of the spa unit 120. Alternatively or in addition, the controller 121 of the spa unit 120 can detect a position of the cover of the spa unit 120 and cause the water temperature of the spa unit 120 to be raised or lowered based on the position of the cover of the spa unit 120.

For example, opening, removing, or detaching a cover of the spa unit 120 may indicate that a user intends to use the spa unit 120 soon thereafter. Thus, even if the spa run schedule is set such that the controller 121 has not yet energized the pump 125 and/or heater 124 by the time that the cover of the spa unit 120 is opened, removed, or detached, the controller 121 may cause or the automated temperature estimator system 150 may cause the controller 121 to cause the pump 125 and/or heater 124 to be energized when the cover of the spa unit 120 is opened, removed, or detached such that the water temperature of the spa unit 120 is raised to the use temperature. The controller 121 may take no action, however, if the water temperature is already at the use temperature.

As another example, closing, applying, or attaching a cover of the spa unit 120 may indicate that a user no longer intends to use the spa unit 120. In response, the controller 121 may cause or the automated temperature estimator system 150 may cause the controller 121 to cause the pump 125 and/or heater 124 to be deenergized such that the water temperature of the spa unit 120 is lowered to the idle temperature or another temperature below the use temperature. The controller 121 may take no action, however, if the water temperature is already at the idle temperature or another desired temperature below the use temperature.

The controller 121 can detect movement of the cover of the spa unit 120 (e.g., detect that the cover is opened, removed, detached, closed, applied, attached, etc.) via a spa cover detection system to which the controller 121 is coupled via a wired or wireless connection. Optionally, the controller 121 can provide to the automated temperature estimator system 150 an indication that the cover opened, removed, detached, closed, applied, attached, etc. when the controller 121 detects such an action (which then allows the automated temperature estimator system 150 to instruct the controller 121 in a manner as described above). The spa cover detection system is described in greater detail in U.S. patent application Ser. No. 18/323,028, entitled "COVER DETECTION SYSTEM FOR SPAS" and filed on May 24, 2023, which is hereby incorporated by reference herein in its entirety.

Figure 9:
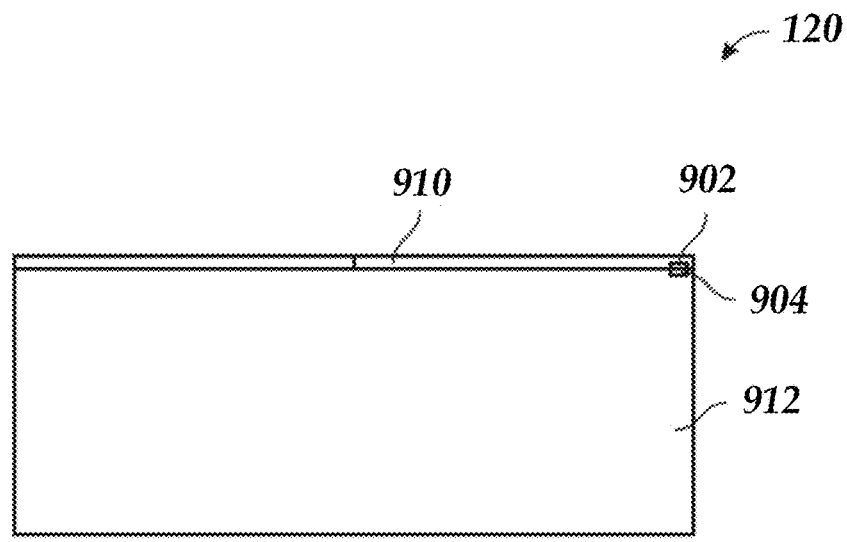
FIGS. 9-10 illustrate a spa cover detection system.
Figure 10:
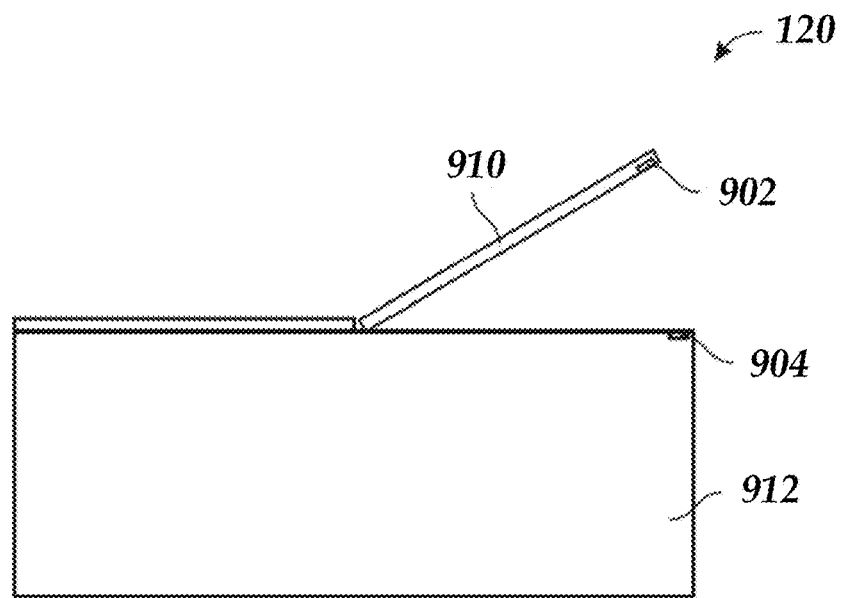

For example, FIGS. 9-10 illustrate a spa cover detection system 900. The spa cover detection system 900 may be desirable for detecting when the spa cover is no longer secured to the spa shell. Beneficially, the components of the spa cover detection system 900 described herein can be easily removed or attached to a new or existing spa unit 120. The spa cover detection system 900 can include a first component and a second element. The first component can be mounted to, for example, one of a spa surface or a spa cover, and the second component can be mounted to the other side of the spa surface or the spa cover. In some cases, however, the first and second components can be mounted to one or more panels of the spa cover. For instance, the first component can be mounted to a first panel and the second component can be mounted to a second panel. When the first and second elements are in contact with each other or close to each other (e.g., 1 mm, 2 mm, 3 mm, 4 mm, 5 mm, 10 mm, 20 mm etc., apart from each other), one of the first and second components can detect the presence of the other. This can beneficially provide an indication about the status of the spa cover (e.g., whether the spa cover is closed or open, properly closed, etc.). In any of the illustrated embodiments herein, the first component can include a sensor and the second component can include a magnet. In some cases, the first component can include a magnet and the second component can include a sensor.

In some cases, the first component can include a light emitter and the second component can include a light sensor. The light sensor can detect the presence and/or intensity of the light emitted by the light emitter when the light emitter and the light sensor are in contact with each other or close to each other. This can beneficially provide an indication that the spa cover is closed or properly secured to the spa shell. When the light emitter and the light sensor are separated from each other, such as when the panel one of the light emitter or the light sensor are attached to is not closed and/or properly secured to the spa shell, the light sensor may not detect the light emitted by the light emitter. This can provide an indication that the spa cover is not closed and/or not properly secured to the spa shell.

In some cases, the light sensor can provide an indication that the spa cover is closed and/or properly secured to the spa shell when the light sensor does not detect light (e.g., when the light sensor abuts a surface of the spa shell, thus not allowing any light into the light sensor). The light sensor can provide an indication that the spa cover is not closed and/or properly secured to the spa shell when the light sensor detects light.

The first component (or second component) may be in wired or wireless communication with the controller 121 to provide the controller 121 with an indication of whether the first component (or second component) detects the presence of the second component (or first component). Detection of the presence of one component by another component can include detecting a magnetic field, detecting light, not detecting light, detecting pressure over a threshold pressure level, detecting contact with an object like the one component, and/or the like. If the first component (or second component) indicates to the controller 121 that the first component (or second component) detects the presence of the second component (or first component), then the controller 121 may determine that the spa cover is closed and/or properly secured to the spa shell. Likewise, if the first component (or second component) indicates to the controller 121 that the first component (or second component) does not detect the presence of the second component (or first component), then the controller 121 may determine that the spa cover is not closed and/or properly secured.

In some embodiments, as illustrated in FIGS. 9-10, the first and second components of the spa cover detection system 900 can comprise a magnet 902 and a sensor 904. The sensor 904 can be a Bluetooth or Bluetooth Low Energy (BLE) sensor or any other type of wired or wireless transceiver. The sensor 904 can be configured to detect the proximity of the nearby magnet 902. The sensor 904 can include a battery configured to power the sensor 904.

The magnet 902 and the sensor 904 can be positioned on the spa unit 120 including, but not limited to, a spa cover or a spa shell. In some embodiments, the magnet 902 can be positioned on spa cover 910 while the sensor 904 is positioned on spa shell 912. In other embodiments, the magnet 902 can be positioned on the spa shell 912 while the sensor 904 is positioned on the spa cover 910. The magnet 902 and/or the sensor 904 can be positioned on different portions of the spa cover 910 and/or spa shell 912. For example, and without limitation, the magnet 902 and/or the sensor 904 can be positioned along portions of the spa cover 910 and the spa shell 912 facing or adjacent to each other. The component of the spa cover detection system 900 on the spa shell 912 can be externally attached to the spa shell 912 or integrated into the spa shell 912, for example in or within an acrylic surface of the spa shell 912.

In embodiments where the magnet 902 is positioned on the spa cover 910 and the sensor 904 is positioned on the spa shell 912, the magnet 902 and sensor 904 can be positioned so that the magnet 902 and the sensor 904 are in proximity or in contact with each other when the spa cover 910 is covering the spa shell 912, thereby allowing the sensor 904 to detect the proximity of the magnet 902. In embodiments where the sensor 904 is positioned on the spa cover 910 and the magnet 902 is positioned on the spa shell 912, the sensor 904 and the magnet 902 can be positioned so that the magnet 902 and the sensor 904 are in proximity or in contact with each other when the spa cover 910 is covering the spa, thereby allowing the sensor 904 to detect the proximity of the magnet 902.

In some embodiments, the sensor 904 can be configured to detect one or more states of the spa unit 120, including at least a first state and a second state. The first state can be a state in which the spa cover 910 is covering an upper end of the spa shell 912, as illustrated in FIG. 9. The second state can be a state in which at least a portion of the spa cover 910 is not covering at least a portion of the upper end of the spa shell 912, as illustrated in FIG. 10. The sensor 904 can detect the first state of the spa unit 120 when, for example, at least a portion of the magnet 902 is in proximity or in contact with at least a portion of the sensor 904, as illustrated in FIG. 9. That is, when the sensor 904 detects the proximity of the magnet 902. On the other hand, the sensor 904 can detect the second state of the spa unit 120 when the magnet 902 and the sensor 904 are not in proximity or in contact with each other, as illustrated in FIG. 10. This may occur, for example, when at least the portion of the spa cover 910 having the magnet 902 and/or the sensor 904 is not covering at least a portion of the spa shell 912. That is, when the sensor 904 does not detect the proximity of the magnet 902.

The spa cover detection system 900 can also include a wireless (or wired) controller onboard or in communication with the spa unit 120. The wireless controller can be configured to communicate with the sensor 904. The wireless controller can also communicate with a remote device (e.g., a cellphone, tablet, smart watch) via cellular, Wi-Fi, or other wireless communication. For example, the wireless controller can include a Bluetooth transceiver for communicating with the sensor 904 and/or remote device. In some embodiments, the wireless controller may include a cellular transceiver for communicating with the remote device and the cellular transceiver may have Bluetooth capabilities. In some embodiments, the remote device may be able to push updates to the wireless controller, enabling the wireless controller to communicate with the sensor 904. Additional details on connectivity between the wireless controller and the remote device can be found in U.S. Patent Publication No. 2021/0283010, which is hereby incorporated by reference herein in its entirety.

The wireless controller can be connected to the remote device via Bluetooth pairing. For example, the user can pair the remote device with the wireless controller by accessing the settings menu, activating the Bluetooth connection, and selecting the device corresponding to the spa unit 120 disclosed herein. In some embodiments, the remote device can receive information from the wireless controller regarding the one or more states of the spa unit 120. For example, the wireless controller can send information to the remote device indicating that the spa unit 120 is in the first state (e.g., the spa cover 910 is open) as shown in FIG. 9, the second state (e.g., the spa cover 910 is closed), and/or whether the spa unit 120 has transitioned from the first state to the second state or vice versa (e.g., whether the spa cover 910 has been closed or opened).

Similarly, the controller 121 can receive information from the wireless controller in addition to or in place of receiving information from the sensor 904. For example, the wireless controller can send information to the controller 121 indicating that the spa unit 120 is in the first state (e.g., the spa cover 910 is open) as shown in FIG. 9, the second state (e.g., the spa cover 910 is closed), and/or whether the spa unit 120 has transitioned from the first state to the second state or vice versa (e.g., whether the spa cover 910 has been closed or opened).

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A system for determining a run schedule of a spa, the system comprising:
   memory that stores computer-executable instructions; and
   a processor in communication with the memory, wherein the computer-executable instructions, when executed by the processor, cause the processor to:
      process an indication of a user spa schedule, ambient temperature data, and spa data, wherein the user spa schedule comprises a use temperature and a time for use of the spa;
      determine, based on the processed ambient temperature data and the processed spa data, a spa heating curve;
      generate, based on the processed user spa schedule and the determined spa heating curve, at least one energy savings option, each of the at least one energy savings option comprising a spa run schedule having an initial heating time; and
      cause, when one of the at least one energy savings option is selected, the spa to activate at least one of a pump of the spa or a heater of the spa at the initial heating time of the selected energy savings option.

2. The system of claim 1, wherein the computer-executable instructions, when executed, further cause the processor to:
train an artificial intelligence model to identify a discrepancy between the spa heating curve and an actual heating curve of the spa using training data, wherein the training data comprises one or more training data items, wherein each training data item of the one or more training data items comprises an indication of an estimated heating curve of a first spa and an actual heating curve of the first spa and is labeled with an indication of a cause of a difference between the estimated heating curve of the first spa and the actual heating curve of the first spa; and
transmit, to a user device, a notification indicative of the cause of the difference between the estimated heating curve of the first spa and the actual heating curve of the first spa.

3. The system of claim 2, wherein the cause of the difference comprises one of a malfunctioning pump of the first spa, a malfunctioning heater of the first spa, or degraded insulation of the first spa.

4. The system of claim 2, wherein each training data item of the one or more training data items further comprises at least one of a model type of the first spa, a location of the first spa, or a volume of the first spa.

5. The system of claim 1, wherein the computer-executable instructions, when executed, further cause the processor to transmit, to a user device, the at least one energy savings option for display on the user device.

6. The system of claim 1, wherein the spa data comprises at least one of an indication of a volume of the spa, an insulation coefficient of the spa, a power rating of the pump of the spa, a power rating of the heater of the spa, a spa model, a spa serial number, or an initial water temperature of the spa.

7. The system of claim 6, wherein the indication of the volume of the spa is received from a level indicator.

8. The system of claim 1, wherein the ambient temperature data is one of an actual air temperature measured at the spa, an air temperature determined based on a location of the spa, or an average regional temperature corresponding to a location of the spa.

9. The system of claim 1, wherein the computer-executable instructions, when executed, further cause the processor to:
obtain, from a sensor coupled to one of a spa cover of the spa or a spa shell of the spa, an indication that the sensor detects a presence of a component coupled to one of the spa shell of the spa or the spa cover of the spa; and
cause the spa to deactivate at least one of the pump of the spa or the heater of the spa.

10. A computer-implemented method for determining a run schedule of a spa, the computer-implemented method comprising:
receiving an indication of,
a user spa schedule,
ambient temperature data, and
spa data comprising an insulation coefficient of the spa, wherein the user spa schedule comprises a use temperature and a time for use of the spa:
determining, based on the received ambient temperature data and the received spa data, a spa heating curve;
estimating, based on the received indication of the user spa schedule and the determined spa heating curve, a spa run schedule, wherein the spa run schedule comprises an initial heating time; and
causing the spa to activate at least one of a pump of the spa or a heater of the spa at the initial heating time.

11. The computer implemented method of claim 10, further comprising:
training an artificial intelligence model to identify a discrepancy between the spa heating curve and an actual heating curve of the spa using training data, wherein the training data comprises one or more training data items, wherein each training data item of the one or more training data items comprises an indication of an estimated heating curve of a first spa and an actual heating curve of the first spa and is labeled with an indication of a cause of a difference between the estimated heating curve of the first spa and the actual heating curve of the first spa; and
transmit, to a user device, a notification indicative of the cause of the difference between the estimated heating curve of the first spa and the actual heating curve of the first spa.

12. The computer implemented method of claim 11, wherein the cause of the difference comprises one of a malfunctioning pump of the first spa, a malfunctioning heater of the first spa, or degraded insulation of the first spa.

13. The computer implemented method of claim 11, wherein each training data item of the one or more training data items further comprises at least one of a model type of the first spa, a location of the first spa, or a volume of the first spa.

14. The computer implemented method of claim 10, wherein estimating the spa run schedule further comprises:
generating an estimated energy savings of the spa using the spa run schedule; and
transmitting, to a user device, at least one of the user spa schedule or the estimated energy savings of the spa.

15. A non-transitory, computer-readable medium comprising computer-executable instructions for determining a run schedule of a spa, wherein the computer-executable instructions, when executed by a computer system, cause the computer system to:
process an indication of a user spa schedule, ambient temperature data, and spa data, wherein the user spa schedule comprises a use temperature and a time for use of the spa;
determine, based on the processed ambient temperature data and the processed spa data, a spa heating curve;
generate, based on the processed user spa schedule and the determined spa heating curve, at least one energy savings option, each of the at least one energy savings option comprising a spa run schedule having an initial heating time; and
cause, when one of the at least one energy savings option is selected, the spa to activate at least one of a pump of the spa or a heater of the spa at the initial heating time of the selected energy savings option.

16. The non-transitory, computer-readable medium of claim 15, wherein the computer-executable instructions, when executed, further cause the computer system to:
train an artificial intelligence model to identify a discrepancy between the spa heating curve and an actual heating curve of the spa using training data, wherein the training data comprises one or more training data items, wherein each training data item of the one or more training data items comprises an indication of an estimated heating curve of a first spa and an actual heating curve of the first spa and is labeled with an indication of a cause of a difference between the estimated heating curve of the first spa and the actual heating curve of the first spa; and transmit, to a user device, a notification indicative of the cause of the difference between the estimated heating curve of the first spa and the actual heating curve of the first spa.

17. The non-transitory, computer-readable medium of claim 15, wherein the computer-executable instructions, when executed, further cause the computer system to:

transmit, to a user device, the at least one energy savings option for display on the user device.

18. The system of claim 1, wherein the at least one energy savings option comprises a lead time and an estimated energy savings indicator, wherein the lead time comprises the time estimated to reach the use temperature.

19. The system of claim 18, wherein, when the estimated energy savings indicator is indicative that energy savings will not be achieved, the computer-executable instructions are configured to, when executed, cause the spa to activate the at least one of the pump or the heater to maintain the spa at a constant water temperature.

20. The non-transitory, computer-readable medium of claim 15, wherein the at least one energy savings option comprises a lead time and an estimated energy savings indicator, wherein the lead time comprises the time estimated to reach the use temperature.

* * * * *